US009959543B2

(12) United States Patent
Maskatia et al.

(10) Patent No.: US 9,959,543 B2
(45) Date of Patent: *May 1, 2018

(54) SYSTEM AND METHOD FOR AGGREGATING RATINGS FOR MEDIA CONTENT

(75) Inventors: Imran Maskatia, Milpitas, CA (US); Jason Rubinstein, Lake Forest, IL (US)

(73) Assignee: Redbox Automated Retail, LLC, Oakbrook Terrace, IL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/567,988

(22) Filed: Aug. 6, 2012

(65) Prior Publication Data
US 2013/0060648 A1 Mar. 7, 2013

Related U.S. Application Data

(60) Provisional application No. 61/525,697, filed on Aug. 19, 2011.

(51) Int. Cl.
*G06Q 30/02* (2012.01)
*H04N 21/258* (2011.01)
(Continued)

(52) U.S. Cl.
CPC ....... *G06Q 30/02* (2013.01); *H04N 21/25875* (2013.01); *H04N 21/25891* (2013.01);
(Continued)

(58) Field of Classification Search
CPC .......... G06F 9/46; G06F 15/173; G06Q 99/00
(Continued)

(56) References Cited

U.S. PATENT DOCUMENTS 7,234,609 B2 *  6/2007  DeLazzer et al. .............. 221/10
7,853,600 B2   12/2010  Herz et al.
(Continued)

FOREIGN PATENT DOCUMENTS

| EP | 2745259 A2 | 6/2014 |
| JP | 2010039517 A | 2/2010 |
| WO | 2013028577 A2 | 2/2013 |

OTHER PUBLICATIONS

International Preliminary Report on Patentability for PCT Application No. PCT/US12/51490 dated Aug. 30, 2013.
(Continued)

*Primary Examiner* — Oluseye Iwarere
(74) *Attorney, Agent, or Firm* — James P. Muraff; Neal, Gerber & Eisenberg LLP

(57) ABSTRACT

Methods of aggregating and importing user-generated and/or professional ratings of media content are provided. User-generated ratings may have been previously created at a ratings source by a user associated with a customer profile. The method for aggregating ratings includes importing the ratings from the ratings source, storing the ratings in a customer profile, normalizing the ratings, and storing the normalized ratings. The normalized rating may be used to determine recommendations and preferences. The method for importing ratings includes receiving authentication information for a ratings source, authenticating to the ratings source, importing the ratings from the ratings source, and storing the ratings in a customer profile. Changes in the ratings may be detected and updated in the customer profile.

12 Claims, 13 Drawing Sheets

(51) Int. Cl.
  *H04N 21/45* (2011.01)
  *H04N 21/454* (2011.01)
  *H04N 21/462* (2011.01)
  *H04N 21/475* (2011.01)

(52) U.S. Cl.
  CPC ....... *H04N 21/454* (2013.01); *H04N 21/4532* (2013.01); *H04N 21/4622* (2013.01); *H04N 21/4756* (2013.01)

(58) Field of Classification Search
  USPC ........ 705/26.7, 347, 330; 709/224; 719/328; 714/47.1
  See application file for complete search history.

(56) References Cited

U.S. PATENT DOCUMENTS

| | | | |
|---|---|---|---|
| 8,060,247 B2 * | 11/2011 | Kaplan | G07F 9/026 700/236 |
| 8,352,449 B1 | 1/2013 | Parekh et al. | |
| 2002/0046122 A1 | 4/2002 | Barber et al. | |
| 2003/0009408 A1 | 1/2003 | Korin | |
| 2003/0163399 A1 * | 8/2003 | Harper et al. | 705/35 |
| 2005/0022239 A1 | 1/2005 | Meuleman | |
| 2005/0246739 A1 * | 11/2005 | Davidson | G06Q 20/3674 725/45 |
| 2006/0265101 A1 * | 11/2006 | Kaplan et al. | 700/231 |
| 2007/0016599 A1 * | 1/2007 | Plastina et al. | 707/101 |
| 2007/0067429 A1 * | 3/2007 | Jain et al. | 709/223 |
| 2009/0030931 A1 | 1/2009 | Khivesara et al. | |
| 2009/0063247 A1 * | 3/2009 | Burgess et al. | 705/10 |
| 2009/0083258 A1 * | 3/2009 | Koren et al. | 707/5 |
| 2009/0144070 A1 * | 6/2009 | Psota | G06Q 10/083 705/330 |
| 2009/0157717 A1 * | 6/2009 | Palahnuk | G06Q 30/00 |
| 2009/0177735 A1 * | 7/2009 | Algie | G06Q 30/0601 709/203 |
| 2009/0299824 A1 | 12/2009 | Barnes, Jr. | |
| 2010/0042577 A1 | 2/2010 | Rinearson | |
| 2010/0185868 A1 * | 7/2010 | Grecia | H04L 9/3234 713/176 |
| 2010/0274624 A1 * | 10/2010 | Rochford et al. | 705/10 |
| 2011/0047594 A1 * | 2/2011 | Mahaffey | G06F 21/564 726/1 |
| 2011/0093329 A1 * | 4/2011 | Bodor et al. | 705/14.42 |
| 2011/0103609 A1 | 5/2011 | Pelland et al. | |
| 2011/0131652 A1 | 6/2011 | Robinson et al. | |
| 2011/0145657 A1 * | 6/2011 | Bishop | G06F 11/3495 714/47.1 |
| 2011/0145920 A1 * | 6/2011 | Mahaffey | G06F 21/564 726/22 |
| 2011/0238194 A1 * | 9/2011 | Rosenberg | 700/94 |
| 2011/0302531 A1 | 12/2011 | Takushima | |
| 2011/0314378 A1 * | 12/2011 | Nijim | G06F 17/3089 715/716 |
| 2012/0082319 A1 * | 4/2012 | Jot et al. | 381/63 |
| 2012/0110174 A1 * | 5/2012 | Wootton | G06F 21/564 709/224 |
| 2012/0233708 A1 * | 9/2012 | Merrifield | 726/30 |
| 2012/0240236 A1 * | 9/2012 | Wyatt | G06F 21/564 726/25 |
| 2012/0311633 A1 * | 12/2012 | Mandrekar et al. | 725/40 |
| 2013/0028576 A1 | 1/2013 | Ushimaru et al. | |
| 2013/0046707 A1 * | 2/2013 | Maskatia | H04N 21/4622 705/347 |
| 2013/0046753 A1 * | 2/2013 | Bowers | G06F 17/3087 707/722 |
| 2013/0060648 A1 * | 3/2013 | Maskatia | G06Q 30/02 705/22 |
| 2013/0060660 A1 * | 3/2013 | Maskatia | G06Q 30/00 705/26.35 |
| 2013/0061260 A1 * | 3/2013 | Maskatia | G07F 17/005 725/28 |
| 2013/0066464 A1 * | 3/2013 | Maskatia | G06Q 30/06 700/234 |
| 2013/0066844 A1 * | 3/2013 | Bowers | G06F 17/30038 707/706 |
| 2013/0073468 A1 * | 3/2013 | Maskatia | G07F 17/16 705/75 |
| 2013/0080415 A1 * | 3/2013 | Maskatia | G06Q 30/02 707/709 |
| 2013/0331985 A1 * | 12/2013 | Felique | G07F 9/026 700/244 |
| 2015/0026260 A1 * | 1/2015 | Worthley | G06Q 10/10 709/204 |

OTHER PUBLICATIONS

International Search Report and Written Opinion for PCT Application No. PCT/US12/51492 dated Aug. 17, 2012.
International Search Report and Written Opinion for PCT Application No. PCT/US12/051490 dated Aug. 17, 2012.
"Canadian Office Action for Canadian Patent Application No. 2604730, dated Aug. 27, 2015.".
"European Search Report for Application No. EP1280399, dated Aug. 19, 2015, 8 pages.".
"Examination Report for European Patent Application No. 12825953.8 dated Mar. 8, 2016".
Supplemental European Search Report for Application No. EP12825953 dated Feb. 6, 2015, 3 pages.

* cited by examiner

SYSTEM AND METHOD FOR AGGREGATING RATINGS FOR MEDIA CONTENT

CROSS-REFERENCE TO RELATED APPLICATION

This application claims priority to U.S. Provisional Application No. 61/525,697, filed Aug. 19, 2011, entitled "SYSTEM AND METHOD FOR AGGREGATING RATINGS FOR MEDIA CONTENT", and is incorporated herein by reference in its entirety.

TECHNICAL FIELD

This invention relates to a system and method for aggregating and normalizing ratings for media content. More particularly, the present invention provides a system and method for the importation and aggregation of ratings, normalizing the ratings, and applying the ratings to affect recommendations and preferences related to media content.

BACKGROUND AND SUMMARY OF THE INVENTION

While the present invention is often described herein with reference to a digital video disc, Blu-Ray disc, and video game distribution system, an application to which the present invention is advantageously suited, it will be readily apparent that the present invention is not limited to that application and can be employed in article dispensing systems used to distribute a wide variety of dispensable articles.

The digital video disc (DVD) player has been one of the most successful consumer electronics product launches in history. The market for DVD movie video, Blu-Ray movie video, and video game rentals is enormous and growing. Millions of households have acquired DVDs since they were introduced in 1997. In the first quarter of 2003 alone, it was estimated that well over three million DVD players were shipped to U.S. retailers.

In 2003, brick-and-mortar stores dominated the movie video and video game rental landscape in the U.S. Statistics showed that two brick-and-mortar companies controlled nearly sixty-five percent of the home video rental business. One element repeatedly cited for success of certain brick-and mortar store video rental franchises was perceived high availability of new video releases. Consumers want entertainment on demand, and through stocking multiple units of each new release, successful brick-and-mortar companies meet this consumer demand.

The foregoing indicates that there is a significant market potential for aligning regular routines of consumers (e.g., shopping, getting coffee or gas or going to a convenience store) with their DVD, Blu-Ray, and video game rental activities.

One improved article dispensing machine is disclosed in commonly owned U.S. Pat. No. 7,234,609, which is herein incorporated by reference in its entirety. The invention of the U.S. Pat. No. 7,234,609 and the present invention can function as an article dispensing machine-based distribution system that will typically have multiple units of each new release per article dispensing machine. The dispensing machines of the U.S. Pat. No. 7,234,609 and the present invention can stock up to two thousand DVDs, Blu-Ray, video games, or other discs (movies, games or other entertainment content), making the system competitive with existing brick-and-mortar video rental superstores.

The dispensing machine and system of the U.S. Pat. No. 7,234,609 and the present invention distinguishes itself from such stores by offering major benefits not conventionally offered by such stores, including additional cross-marketing programs (e.g., promotional rentals for a certain amount of dollars spent at the retail location) and convenience (e.g., open always).

The dispensing machine of the U.S. Pat. No. 7,234,609 and the present invention yields a competitive advantage in the DVD, Blu-Ray disc, and video game rental marketplace by offering consumers cross-marketing/promotional programs, convenience of selection (e.g., computer-based searches for movies and recommendations based on consumer profiles), and potentially extended hours. The present invention employs a more cost-effective, convenient platform than brick-and-mortar stores. In addition, with the present invention, dispensing machines can be situated in retail locations having high foot traffic, such as at a popular grocery store, restaurant, drug store, and/or other popular retail location.

The dispensing machine of the U.S. Pat. No. 7,234,609 and the present invention can be operated at a substantial savings over the costs associated with traditional brick-and-mortar video rental stores. For example, the present invention does not require hourly employees manning the dispensing machines or restocking them with inventories, due to the ability of the article transport storage units to be delivered to/picked up from retail locations by third-party delivery services, such as traditional or contracted courier services.

Unlike brick-and-mortar stores, the dispensing machine of the U.S. Pat. No. 7,234,609 and the present invention does not require an on-site store manager because all operational decisions can be made at a centralized location by a management team officed remote from the retail locations. Unlike brick-and-mortar stores, the dispensing machine of the U.S. Pat. No. 7,234,609 and the present invention does not require significant physical space. Unlike brick-and-mortar stores, the dispensing machine of the U.S. Pat. No. 7,234,609 and the present invention has low operating costs because no heating or air conditioning is required for the dispensing machines and they consume a relatively low level of electrical energy. In addition, the dispensing machine of the U.S. Pat. No. 7,234,609 has low maintenance costs and downtime.

The dispensing machine of the U.S. Pat. No. 7,234,609 and the present invention addresses the shortcomings of traditional brick-and-mortar stores in a convenient and cost-effective delivery vehicle having the added bonus of serving as an effective promotional platform that drives incremental sales to retail locations. In addition, the dispensing machine of the U.S. Pat. No. 7,234,609 and the present invention overcomes these disadvantages by at least offering more new releases and older selections for any given time period, and lower cost per viewing with significantly more convenience than Internet-based and pay-per-view services.

The dispensing machine of the U.S. Pat. No. 7,234,609 and the present invention is a fully automated, integrated DVD, Blu-Ray, and video game rental and/or purchase systems. It preferably incorporates robust, secure, scalable software that provides a fully personalized user experience and real-time feedback to retail locations and advertisers, scalable hardware that leverages existing technologies such as touch screen, focused audio speakers and video monitors, technology utilizing the Internet through a system website or mobile/consumer electronics device application, and an article transport storage unit that facilitates the exchange of new discs for old discs in each machine with virtually no need for human intervention. These technologies and others fill long-felt needs in the art and give advantages over conventional video distribution options. The dispensing machine of the U.S. Pat. No. 7,234,609 and the present invention functions as much as a promotional platform as it does a rental kiosk.

By utilizing the dispensing machines and the fully-interactive, real-time, linked Internet website or mobile/consumer electronics device applications, consumers can rent one or more DVDs, Blu-Ray discs, video games, or other entertainment content directly from dispensing machines as well as indirectly by making a rental reservation through the website or application for later pickup at a conveniently located machine. These dispensing machines are preferably networked with each other, with the inventory control and/or supply office and with the system website or application by phone-line, DSL, wireless network, or other Internet connection at each retail location. Through this linked network, the rental experience for each consumer can be customized based on a profile for each consumer, such as via personalized home pages and rental screens.

Existing ratings systems allow a user to create subjective ratings of pieces of media content. However, the ratings are generally confined to the system that the ratings were created on. For example, a user can rate pieces of media content at a digital media content provider but must separately rate the same pieces of media content at a movie ratings website. The user may become frustrated in having to enter their ratings in multiple systems. Moreover, different existing ratings systems may utilize the ratings in different ways. For example, systems may use different recommendation methodologies, resulting in conflicting recommendations. Furthermore, the recommendations generated on a first system where the user has entered a small number of ratings will likely be less useful and applicable than recommendations generated on a second system where the user has entered a larger number of ratings.

The present invention allows for aggregating ratings for media content from multiple ratings sources into a customer profile. The ratings from the ratings sources may also be normalized. Recommendations of media content and browsing preferences related to the listing of media content may be determined based on the aggregated and/or normalized ratings. The ratings may be displayed or shared with other users, either individually, aggregated together, and/or in a normalized format. The present invention overcomes disadvantages of existing ratings systems by aggregating and/or normalizing the ratings from multiple ratings sources in the customer profile, and by using the aggregated ratings to affect recommendations and preferences. Other features and advantages are provided by the following description and drawings.

DETAILED DESCRIPTION OF THE INVENTION

Figure 1:
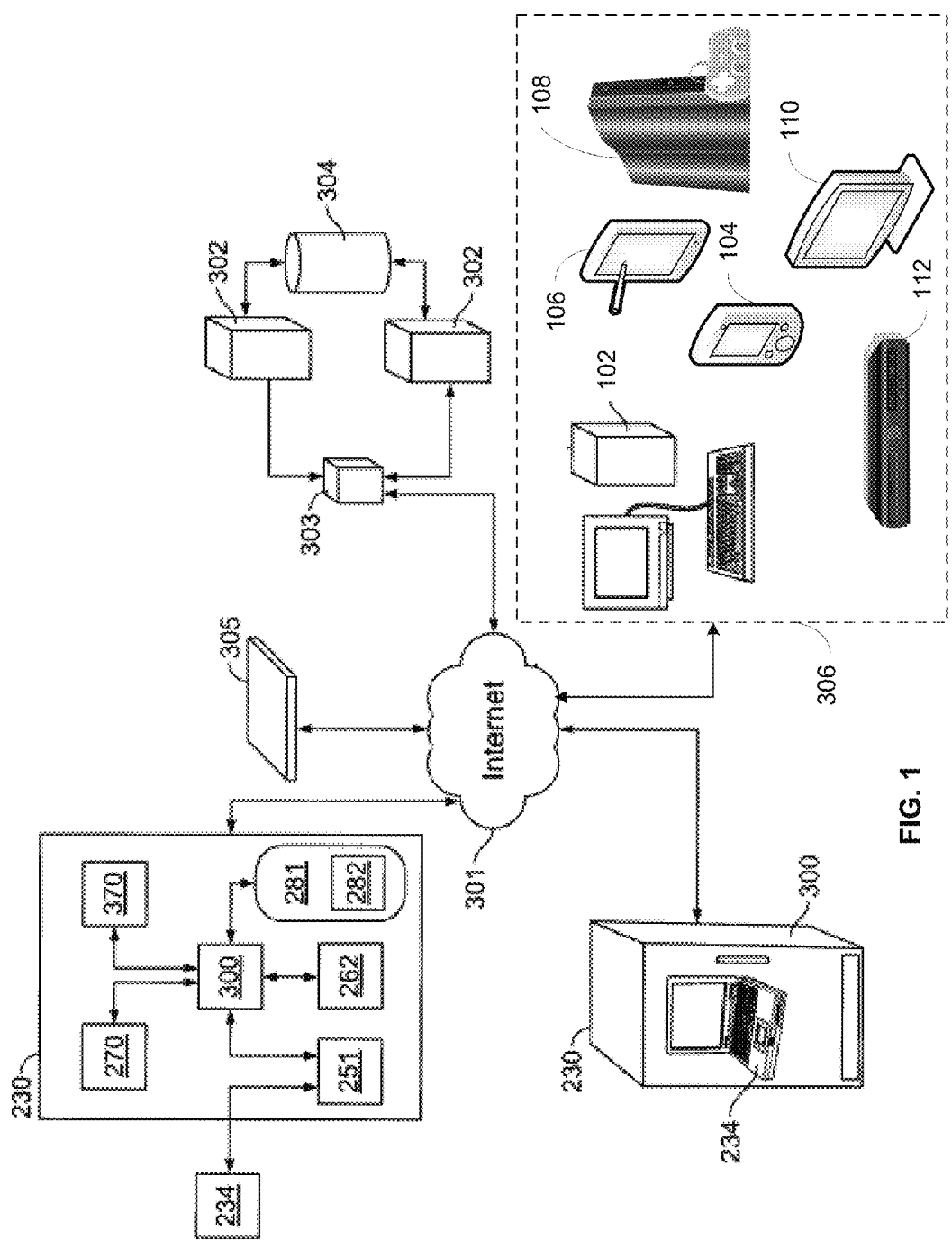
FIG. 1 is an illustration of a system for communicating and processing information in a network of article dispensing machines and dispensing apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
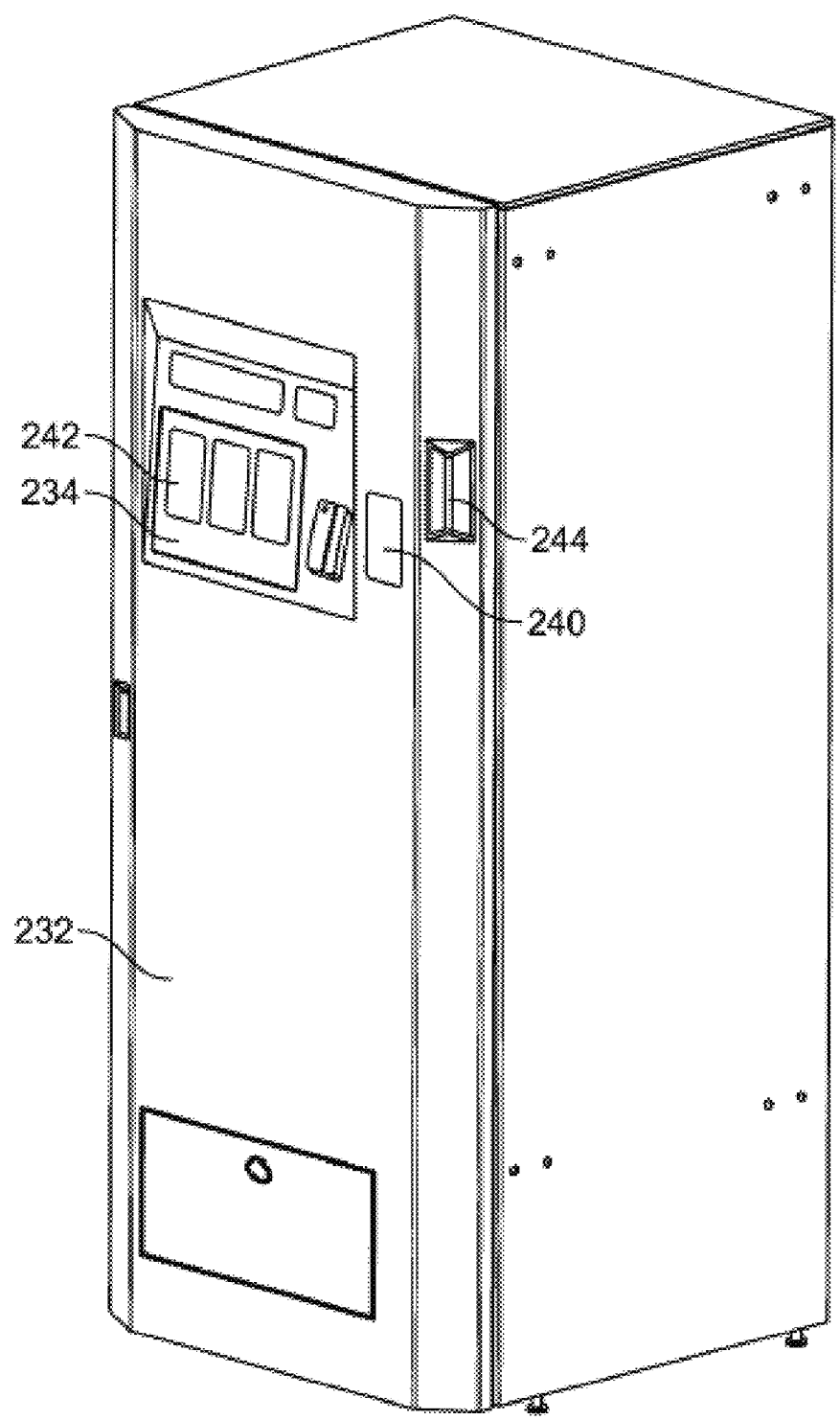
FIG. 2 is a perspective view of an article dispensing machine constructed in accordance with the principles of the present invention.

FIGS. 1-2 illustrate an article dispensing machine designated 230. Article dispensing machine 230 is one of a plurality of article dispensing machines included within an article distribution system having a plurality of such machines situated at a plurality of retail locations. The article dispensing machines of a particular article distribution system preferably form a network. As such, those machines are preferably in electrical communication with each other and with a central server or central controller.

As shown in FIG. 1, each article dispensing machine 230 includes a dispensing machine processor 300, also referred to herein as a vending controller, which is connected to a first sensor 270 and a second sensor 370, a first motor 251 and a second motor 262 and a user interface control system 234, collectively referred to as "the peripheral devices." The processor is capable of executing various programs to provide input to and/or receive outputs from the peripheral devices. Suitable processors for such use are known to those of skill in the art. In addition, the processor is operably connected to at least one memory storage device 281, such as a hard-drive or flash-drive or other suitable memory storage device.

Article dispensing machine memory storage device 281 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, article dispensing machine memory storage device 281 may incorporate electronic, magnetic, optical, and/or other types of storage media. Article dispensing machine memory storage device 281 can have a distributed architecture where various components are situated remote from one another, but are still accessed by processor. Article dispensing machine memory storage device includes an article dispensing machine database 282.

The article dispensing machines 230 preferably comprise a network of machines in communication with one another. As shown in FIG. 1, in the preferred configuration, the article dispensing machines 230 are networked with one another via a central server or central controller 302 in a hub-and-spoke system. However, optionally, the article dispensing machines may be connected and communicate directly with one another, and/or subsets of article dispensing machines may communicate with one another directly as well as with the central server 302.

Figure 3:
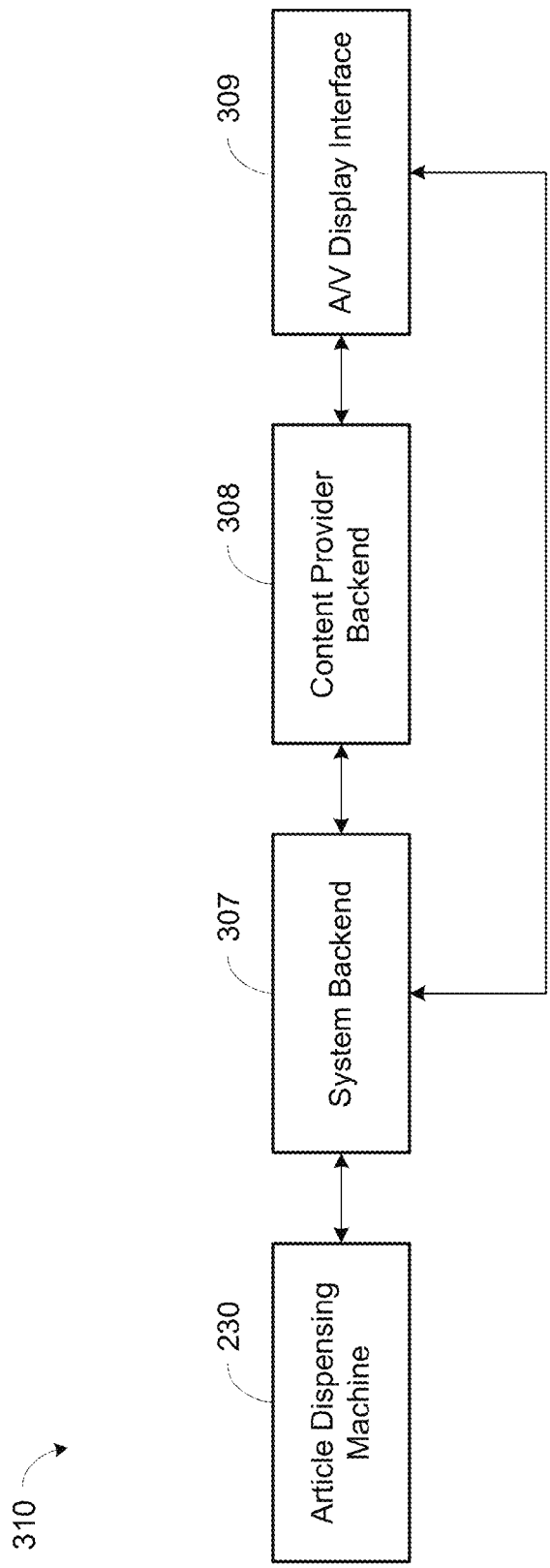
FIG. 3 is a high-level block diagram illustrating a networked media content system and connections including an article dispensing machine, a system backend, a content provider backend, and an A/V display interface.

Generally, in terms of hardware architecture, the central server 302 and the content provider backend 308 shown in FIG. 3 include a central processor and/or controller, central memory, and one or more input and/or output (I/O) devices (or peripherals) that are communicatively coupled via a local interface. The architecture of the central server 302 is set forth in greater detail in U.S. Pat. No. 7,234,609, the contents of which are incorporated herein by reference. Numerous variations of the architecture of the central server 302 and the content provider backend 308 would be understood by one of skill in the art and are encompassed within the scope of the present invention.

The processor/controller is a hardware device for executing software, particularly software stored in memory. The processor can be any custom made or commercially available processor, a central processing unit (CPU), an auxiliary processor among several processors associated with the server 302, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, MUMPS/Magic.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers, smartphones, or personal digital assistants (PDAs) (e.g., PalmOS available from Palm Computing, Inc., Windows CE or Windows Phone available from Microsoft Corporation, iOS available from Apple Inc, Android available from Google Inc., BlackBerry OS available from Research in Motion Limited, Symbian available from Nokia Corp.). The operating system essentially controls the execution of other computer programs and provides scheduling, input-output control, file and data management, memory management, and communication control and related services.

Steps and/or elements, and/or portions thereof of the present invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the present invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Ada, and Lua.

When article dispensing machine 230 is in operation, the article dispensing machine processor is configured to execute software stored within article dispensing machine memory, to communicate data to and from the dispensing machine memory, and to generally control operations of article dispensing machine pursuant to the software. The software aspects of the present invention and the O/S, in whole or in part, but typically the latter, are read by processor, perhaps buffered within the processor, and then executed.

When the present invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication with the central server 302, article dispensing machine 230 is equipped with network communication equipment and circuitry. In a preferred embodiment, the network communication equipment includes a network card such as an Ethernet card. In a preferred network environment, each of the plurality of article dispensing machines 230 on the network is configured to use the TCP/IP protocol to communicate via the network 301. It will be understood, however, that a variety of network protocols could also be employed, such as IPX/SPX, Netware, PPP and others. It will also be understood that while a preferred embodiment of the present invention is for article dispensing machine 230 to have a "broadband" connection to the network 301, the principles of the present invention are also practicable with a dialup connection using a standard modem. Wireless network connections are also contemplated, such as wireless Ethernet, satellite, infrared, radio frequency, Bluetooth, near field communication, and cellular networks.

The central controller 302 communicates with the article dispensing machine controllers 300 via the network 301. The central controller 302 is preferably located at a central station or office that is remote from the plurality of article dispensing machines 230. The central controller 302 can operate as the server for communicating over the network 301 between the plurality of article dispensing machines 230. The central controller 302 receives communications and information from the article dispensing machines 230, and also transmits communications and information to the machines 230. For example, when a rental transaction is performed at the article dispensing machine 230, transaction data such as the rented title is then transmitted from the machine 230 to the central controller 302 via the network 301. It will be understood that central servers in general, such as the central controller 302, are often distributed. A plurality of central servers/controllers 302 may optionally be arranged in "load balanced" architecture to improve the speed and efficiency of the network. To accomplish the implementation of multiple controllers 302, the controllers 302 may be in communication with a router/distributor 303.

The central controller 302 is also in communication with a central database 304. The central database 304 stores information regarding the transaction network. For example, the central database 304 stores data regarding the vending inventory at each of the plurality of article dispensing machines 230. The central database 304 also stores sales information regarding the sales quantities of the vending merchandise stored in the machines 230. For example, the central database 304 stores information regarding the sales totals for each title and for each machine 230 vending location. Central database 304 also stores user information and rental transaction information, such as user IDs, the date on which discs are due to be returned, the date on which discs were rented from the machines 230 and a list of valid coupon codes and restrictions associated with those codes. In certain embodiments, central database 304 also may be configured to store user PINs. Some of this information is also preferably stored in article dispensing machine database 282.

Central database 304 and databases in the content provider backend 308, such as the content provider customer profile database 502 and other databases, are preferably relational databases, although other types of database architectures may be used without departing from the principles of the present invention. For example, the databases 304 and 502 may be a SQL database, an Access database or an Oracle database, and in any such embodiment have the functionality stored herein. Central database 304 is also preferably capable of being shared, as illustrated, between a plurality of central controllers 302 and its information is also preferably capable of being transmitted via network 301. It will be understood that a variety of methods exist for serving the information stored in central database 304 and database 502.

In one embodiment, .net and Microsoft Reporting Services are employed, however, other technologies such as ODBC, MySQL, CFML and the like may be used.

The central controller 302, central database 304, and components of the content provider backend 308 are also accessible by an electronic device 306, which may include a personal computer 102, mobile device 104 (e.g., smartphone, personal digital assistant, etc.), tablet computer 106, video game console 108, television 110, and Blu-Ray player 112. The electronic device 306 may be in direct or indirect communication with the central controller 302, central database 304, and/or the content provider backend 308 through a wired and/or wireless network connection, such as Ethernet, Wi-Fi, cellular (3G, 4G, etc.), or other type of connection. As a personal computer 102, the electronic device 306 will be understood as comprising hardware and software consistent with marketable personal and laptop computers, such as a display monitor, a keyboard, and a microprocessor. The electronic device 306 may also comprise Internet browser software such as Firefox, Internet Explorer, Chrome, or Safari. Using the browser software, a user of the electronic device 306 can access a web interface through the central controller 302. An application may also execute on the electronic device 306 that accesses the central controller 302. To that end, central controller 302 preferably comprises web server software such as IIS or Apache. It will be understood that a variety of web server software and web browser software exists to implement the principles of the present invention without departing therefrom. Through the web browser software or application, the electronic device 306 communicates with the central controller 302 and allows the user to login to a central command functionality of the central controller 302 and to view and modify data stored in the central database 304. The browser interface or application also allows the user to perform certain system functions, which will affect the inventory and behavior of the article dispensing machines 230. The electronic device 306 may communicate with the central controller 302, central database 304, and components of the content provider backend 308 using rules and specifications of an application programming interface (API).

In a preferred embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 1, the financial server 305 is illustrated as a single server, although the financial server 305 may comprise an entire sub-network of financial servers 305 responsible for processing financial information.

As shown in FIG. 2, article dispensing machine 230 includes a machine housing 232 with front, rear, top, bottom and side panels. The machine housing 232 is preferably a combination molded fiberglass and sheet metal cabinet. However, those skilled in the art will appreciate that the housing can be constructed from a variety of other suitable materials and with a variety of other suitable manufacturing techniques.

As shown most clearly in FIG. 2, a user interface portion 234 of housing 232 includes a card reader 240, a keypad and/or touch screen 242 and an article transfer opening 244. The card reader 240 is preferably designed in known fashion to read magnetically encoded membership and/or credit/debit cards for authorizing the distribution of articles of inventory through the article transfer opening 244. Keypad and/or touch screen 242 permits consumers and/or inventory stocking personnel to communicate with the dispensing machine 230 and/or a central office linked in electrical communication with the dispensing machine. Keypad and/or touch screen 242 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks. The touch screen 242 may also be capable of displaying a QR (Quick Response) code to a customer. The customer may read the QR code with a camera on a mobile device or with a dedicated QR code reader. The QR code can represent a universal resource locator (URL) to access a digital media selection, for example.

Furthermore, it will be appreciated that additional user interface portions having additional or even identical user interface components could be incorporated within article dispensing machine 230. For example, these components could be incorporated on other panels of the housing 232 of machine 230 so that the machine can be used simultaneously by multiple consumers, translating into more efficient distribution of articles in high traffic areas. Dispensing machine 230 also preferably includes speaker units. Known audio technology may be incorporated within dispensing machine 230 to broadcast focused audio directed to relatively small (e.g., three square feet) locations in front of the machines from speaker units and/or in other designated locations at a retail site.

FIG. 3 illustrates a networked media content system 310 including an article dispensing machine 230, a system backend 307, a content provider backend 308, and an audio/visual (A/V) display interface 309. The networked media content system 310 provides for a variety of processes involving management, manipulation, searching, presentation, and notification related to digital media content and vendible physical media articles, including processes related to the present invention. The networked media content system 310 allows for direct and indirect communication between the components in the networked media content system 310 via one or more networks. The components in the networked media content system 310 may be operated by one or more entities. In one embodiment, the article dispensing machine(s) 230 and the system backend 307 are operated by a first entity, such as the operator of the article dispensing machines, while the content provider backend 308 and the A/V display interface 309 are operated by a second entity, such as a content provider. In another embodiment, all of the components shown in the networked media content system 310 of FIG. 3 are operated by the same entity. The physical media article may include at least a DVD, Blu-Ray disc, video game disc, or other media article including those that are out-of-stock or otherwise unavailable for rental. The digital media selections may include streaming video content, video-on-demand content, downloadable video content, streaming video games, downloadable video games, or other digital media content. Streaming or downloadable video games may include content related to video games, such as expansion packs and add-on packs. Although FIG. 3 shows a single content provider backend 308 and a single A/V display interface 309, it is contemplated that more than one content provider backend and/or A/V display interfaces may be in communication with the system backend 307.

The system backend 307 includes components that primarily communicate information, such as transaction and inventory data, to and from the article dispensing machines 230. Components in the system backend 307 also communicate information to and from the content provider backend 308 and the A/V display interface 309. The system backend 307 is detailed below with reference to FIG. 4. The content provider backend 308 includes components that primarily communicate information to and from the A/V display interface 309. Components in the content provider backend 308 also communicate information to and from the system backend 307, as detailed further below. Data communicated between the article dispensing machines 230, the system backend 307, the content provider backend 308, and/or the A/V display interface 309 may utilize the XML (Extensible Markup Language) format. The A/V display interface 309 may communicate with the system backend 307 and/or the content provider backend 308 using rules and specifications of an application programming interface (API).

The A/V display interface 309 can be a set-top box, a module of an internet-ready television, a Blu-Ray player with internet connectability, a software application executing on a mobile device, cable television converter box, satellite television set-top box, IPTV (Internet Protocol television) set-top box (including AT&T U-Verse), digital video recorder, tablet computer, video game console (including Microsoft Xbox family, Sony PlayStation family, Nintendo Wii, and similar devices), handheld gaming device (including Sony PlayStation Portable, Nintendo DS, and similar devices), laptop computer, desktop computer, streaming media box (including Apple TV, Google TV, Roku, Boxee, and similar devices), or any other device capable of receiving and displaying streaming, on-demand, and/or downloadable electronic media from a content provider. Moreover, applications may be installed and executed on the A/V display interface 309 that communicate with the system backend 307 and/or the content provider backend 308 to provide media content and other information to a user of the A/V display interface 309.

The article dispensing machines 230 can communicate with the system backend 307, including the central server and controller 302, via network communication equipment and circuitry, as detailed above. Furthermore, the system backend 307 can communicate with the content provider backend 308 and the A/V display interface 309 via the same or different network communication equipment and circuitry. In particular, the system backend 307 can directly communicate with the content provider backend 308 and the A/V display interface 309, or in one embodiment, the system backend 307 can communicate with the A/V display interface 309 through the content provider backend 308. It will also be understood that while a preferred embodiment of the present invention is for the components of the system 310 to have a "broadband" connection with one another, the principles of the present invention are also practicable with a dialup connection using a standard modem. Wireless network connections are also contemplated, such as wireless Ethernet, satellite, infrared, radio frequency, Bluetooth, near field communication, and cellular networks.

Each of the article dispensing machines 230 may operate without requiring continuous connectivity and communication with the central controller 302. In one embodiment, the central controller 302 only transmits data in response to communication from an article dispensing machine 230. For example, an article dispensing machine 230 may attempt to communicate with the central controller 302 following completion of one or more rental transactions or one or more media article return transactions. In another embodiment, the article dispensing machine 230 continues normal operations and transactions even if communication is interrupted or cannot be established with the central controller 302. In these cases, transaction data can be stored locally in the article dispensing machine 230, such as in the article dispensing machine memory storage device 281, until a predetermined time interval elapses, when a predetermined number of transactions is reached, or until communication with the central controller 302 can be reestablished. Once communication is established with the central controller 302, financial and inventory information can be uploaded and the appropriate servers and databases can be updated.

In one embodiment, the article dispensing machine 230 can display only media articles which are physically located at the article dispensing machine 230. In this way, a customer may browse on the user interface 234 only the media articles which are in-stock and available to rent at that article dispensing machine 230. Typically, the article dispensing machine 230 possesses media information for the media articles that are currently located in the article dispensing machine 230. The media information for a media article includes title, actor, director, studio, publisher, plot synopsis, format, description, parental rating, individualized ratings and reviews, popularity, article type, running time, genre, cover artwork, or other information. The article dispensing machine 230 can also store in memory the media information for recently-rented media articles that are no longer physically stored in the article dispensing machine 230. The article dispensing machine 230 can communicate with the central controller 302 when media information about a particular media article is needed. For example, when a particular media article is returned to an article dispensing machine 230 that does not have the corresponding media information for that particular media article, the article dispensing machine 230 can query the central controller 302, metadata database 410, and/or inventory database 412 for the media information. Once the media information is obtained, the article dispensing machine 230 may display that particular media article on the user interface 234 as in-stock and available to rent.

In another embodiment, the article dispensing machine 230 can display media articles that are both physically located and not physically located at the article dispensing machine 230. In this embodiment, media articles which are both available and unavailable to rent can be displayed. A media article may be unavailable to rent if it is not in-stock or is in-stock but has been reserved for rental. In one example, the entire catalog of media articles stored in the inventory database 412 can be displayed on the article dispensing machine 230. In another example, a subset of the entire catalog of media articles can be displayed on the article dispensing machine 230. The subset of media articles that can be displayed on the article dispensing machine 230 may be determined, for example, based on geographic location, retailer agreements, contractual obligations, customer rental habits, and other criteria. The media articles that can be displayed on the article dispensing machine 230 may include recently-rented media articles that are no longer physically stored in the article dispensing machine 230 or media articles that have never been physically in the article dispensing machine 230. For example, media articles that have never been physically in the article dispensing machine 230 may be displayed because those media articles may be available at a nearby article dispensing machine. In this case, those media articles may be displayed to the customer so that the customer has an option to obtain those media articles from the nearby article dispensing machine 230. In this embodiment, if a customer attempts to rent a media article that is out-of-stock, reserved for another customer, or otherwise cannot be vended at the particular article dispensing machine 230, then that media article can be deemed an unavailable media article. Although a physical unavailable media article cannot be rented from the particular article dispensing machine 230, a digital alternative media selection may be available and substituted for the unavailable media article.

Figure 4:
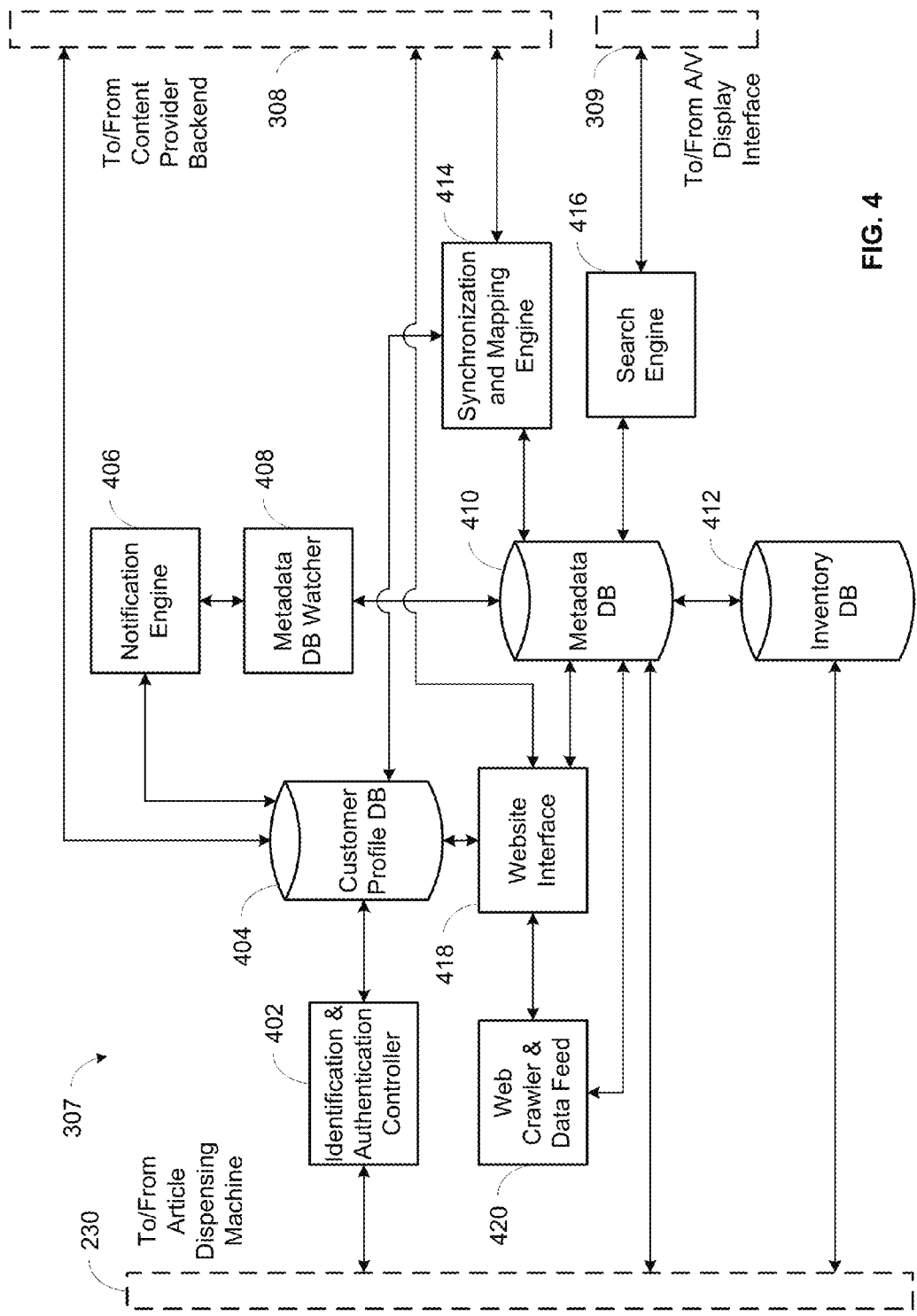
FIG. 4 is a block diagram illustrating the system backend.

FIG. 4 is a block diagram illustrating the system backend 307 and connections to and from the system backend 307 to the article dispensing machines 230, the content provider backend 308, and the A/V display interface 309. The system backend 307 includes components that provide and receive data to and from the article dispensing machines 230 during DVD, Blu-Ray disc, and video game rental transactions and other transactions. Components in the system backend 307 are utilized in relation to the present invention, as described below. It will be understood that components 402, 404, 406, 408, 414, 416, 418, and 420 in the system backend 307 may be implemented, for example, by the central controller 302 using instructions stored in a memory connected to the central controller 302. It will be further understood that the databases 404, 410, and 412 may be implemented as part of the central database 304 or as separate databases.

The identification and authentication controller 402 can receive a unique customer identifier that a customer provides to the article dispensing machines 230 during a rental transaction. The unique customer identifier can be a credit or debit card number, a hashed version of a credit or debit card number, or other unique identifier used for payment and/or identification purposes. In the case of hashing of the credit or debit card number, the hash function applied to the credit or debit card number is preferably implemented on the article dispensing machines 230 and may be, for example, a SHA-256 hashing algorithm. The identification and authentication controller 402 can validate the payment capability of a credit or debit card by communicating with the financial server 305.

Figure 5:
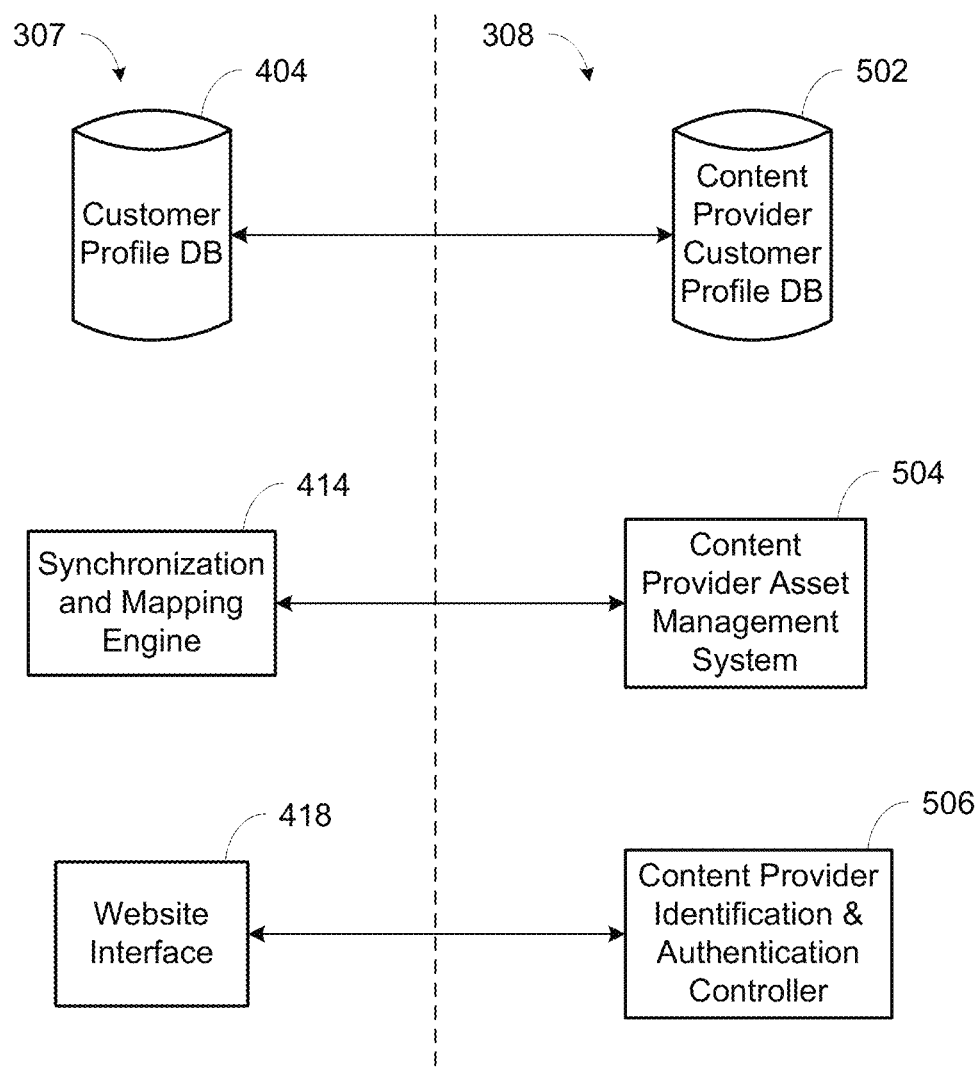
FIG. 5 is a block diagram illustrating connections between the system backend and the content provider backend.

A customer may be authenticated to multiple customer profiles and accounts by the identification and authentication controller 402. The unique customer identifier provided by the customer can authenticate the customer to an existing customer profile and account for the article dispensing machines 230. The existing customer profile and account can be stored and looked up using the unique customer identifier in the customer profile database 404 that is connected to the identification and authentication controller 402. The unique customer identifier can also link the existing customer account to a content provider customer account via a connection from the customer profile database 404 to the content provider customer profile database 502 in the content provider backend 308, as shown in FIG. 5. Zero, one, or more content provider customer accounts may be linked in the customer profile database 404 to the existing customer account for the article dispensing machines 230. A content provider may include, but is not limited to, a cable television operator, a satellite television service provider, an IPTV (Internet Protocol television) provider, an online gaming and digital media delivery service (Xbox Live, PlayStation Network, OnLive, etc.), a website (YouTube, Hulu, etc.), a movie studio, a television network, a game publisher, or a retailer (Best Buy, Walmart, etc.). Media selections available from a content provider may include videos on demand, streaming videos, downloadable videos, streaming video games, or downloadable video games. The media selections may be available through the A/V display interface 309 that is in communication with the content provider backend 308.

The customer profile database 404 can contain information related to customers of the article dispensing machines 230, including name, mailing and billing addresses, email addresses, phone and mobile numbers, username, password, payment methods, rental history, purchase history, preferred article dispensing machines, movie and video game genre preferences, customizations, subscriptions, parental controls, linked content provider accounts, content provider subscriptions and entitlements, and other data. A rental transaction can be personalized using information from the customer profile database 404 at the article dispensing machines 230 and a website interface 418. For example, only certain genres and titles of DVDs, Blu-Ray discs, or video games could be shown if a customer sets particular preferences that are then stored in the customer profile database 404. Some of the information stored in the customer profile database 404 may also be stored in the article dispensing machine database 282. The customer profile database 404 may include a service which facilitates interfacing and communicating with a notification engine 406 and other components of the system backend 307, for example.

The website interface 418 can be interactive and accessible to a customer using web browser software at an electronic device 306. The website interface 418 may also include a mobile application or consumer electronics device application. Rentable media articles may be searched, browsed, and reserved on the website interface 418 for receipt at the article dispensing machines 230. The location of and the inventory at article dispensing machines 230 can be viewed at the website interface 418. Digital media selections from content providers, such as streaming, downloadable, and on-demand media, may also be searched, browsed, and accessed on the website interface 418. A customer can access their customer profile on the website interface 418 for purposes of verifying and updating their personal information in the customer profile database 404. For example, a customer can link an account they have with a content provider on the website interface 418 by specifying their username, password, account number, and/or other identifying information for the content provider account. The system backend 307 can utilize SAML (Security Assertion Markup Language), OAuth (Open Authentication), or other protocols to authenticate the identity of the customer at the content provider via a connection from the website interface 418 to the content provider identification and authentication controller 506 in the content provider backend 308, as shown in FIG. 5. If the identifying information matches the content provider account, the linkage to the content provider account can be stored in the customer profile database 404.

An inventory database 412 may contain a catalog of physical media articles that may be rented at the article dispensing machines 230 and reserved at the website interface 418 for later receipt at the article dispensing machines 230. A catalog of digital media selections available at the content provider can be contained in the metadata database 410. Metadata for the media articles and media selections are stored in the metadata database 410, including title, release date, running time, chapter information, technical details (resolution, audio options, languages, etc.), format, peripheral device requirements, number of players, online capability, actors, voice actors, director, studio, publisher, developer, platform, availability of downloadable content, episode information, genre, critic ratings, individualized ratings (reviews, recommendations, likes, etc.), parental ratings (MPAA, ESRB, TV Parental Guidelines, etc.), description, related content, media artwork, media stills, and other information.

Physical media articles that may be rented at the article dispensing machines 230 and digital media selections available at the content provider may be synchronized and mapped to one another by matching their respective metadata. As seen in FIG. 5, a synchronization and mapping engine 414 connected to the customer profile database 404, the metadata database 410, and the content provider asset management system 504 in the content provider backend 308 may compare the metadata for the media articles and media selections to determine matches. Metadata in the content provider asset management system 504 for media selections can be compared to metadata in the metadata database 410 to perform the matching. For example, a combination of a title, release date, running time, and/or actor information can be used to map a media article to a corresponding media selection. In one embodiment, proprietary identification codes unique to a media article and a media selection can be used to map the media article to the corresponding media selection. The proprietary identification codes for the media article and the media selection can be stored in the metadata database 410 and the content provider asset management system 504, respectively. Such proprietary identification codes can be assigned to media articles and media selections by third party providers such as Rovi, Baseline, and AMG.

Figure 6:
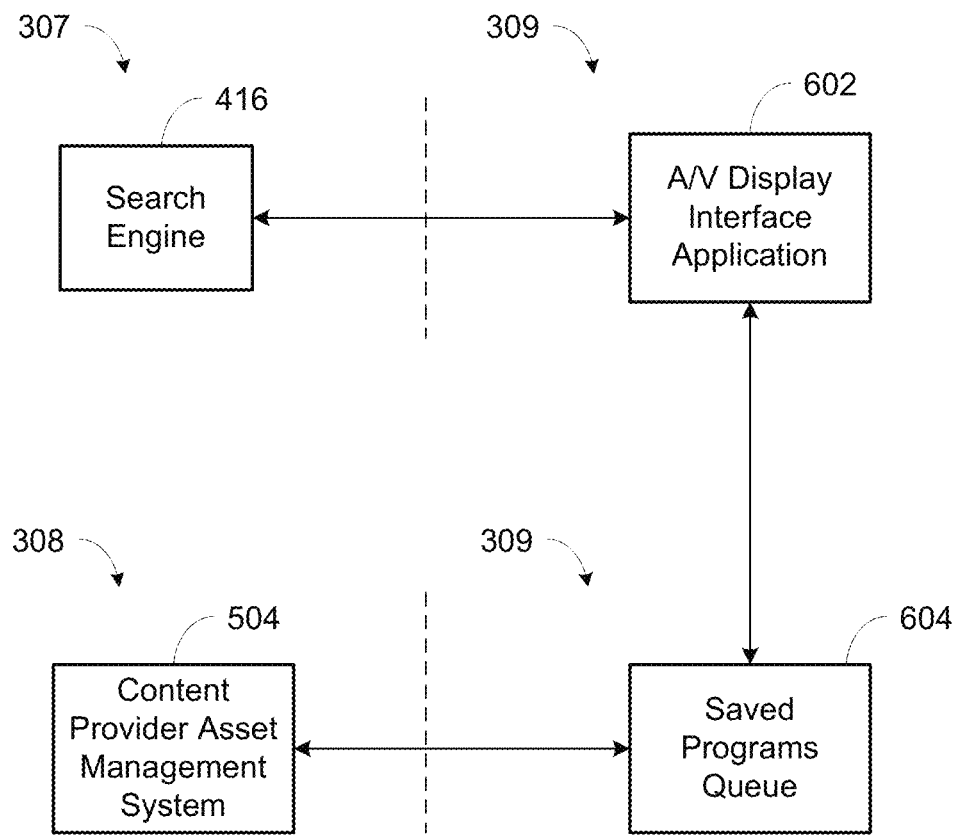
FIG. 6 is a block diagram illustrating connections between the system backend, the content provider backend, and the A/V display interface.

A media selection at a content provider can be placed in the saved programs queue 604 on the A/V display interface 309, as shown in FIG. 6, by providing the appropriate instructions to the content provider asset management system 504 in the content provider backend 308. Queuing a media selection may occur, for example, when a customer decides to purchase the digital media selection from the content provider in place of a physical media article at an article dispensing machine 230.

An inventory database 412 can be connected to the article dispensing machine 230 and the metadata database 410 to provide information regarding the availability of media articles in the article dispensing machines 230. In conjunction with a search engine 416, the inventory database 412 and the metadata database 410 can provide inventory results for media articles and media selections to an A/V display interface application 602 on an A/V display interface 309, as shown in FIG. 6. Such results may include the availability of physical media articles at the article dispensing machines 230 as well as digital media selections available at a content provider. The results may also be provided to the website interface 418 or other websites operated by a content provider, for example. The synchronization and mapping engine 414 can store the information from the content provider asset management system 504 regarding media selections at the content provider in the metadata database 410. The inventory database 412 can also supply the availability of media articles in the article dispensing machines 230 to the website interface 418 or to other portals, such as an application on a mobile device, when queried.

A metadata database watcher 408 can monitor the metadata database 410 for changes in metadata related to media articles and media selections. The metadata database watcher 408 can use customer watchlist subscriptions from a customer profile in the customer profile database 404 to determine what changes to monitor. The changes to the metadata can include inventory availability, content provider availability, release schedules, and other information related to a particular title. The customer watchlist subscriptions can be used by the metadata database watcher 408 to monitor these changes in combination with information regarding particular actors, directors, and/or other metadata. When a change corresponding to a customer watchlist subscription is found by the metadata database watcher 408, a notification engine 406 can transmit notifications and details of the change to the customer. The notifications may be sent via email, SMS, mobile application alerts, A/V display interface alerts, or other electronic channels.

A customer may also subscribe to be notified about new information and new media content related to their favorite actors, directors, titles, studios, and/or other parameters using customer notification subscriptions. Such information may include information related to live performances, television appearances, newspaper and magazine articles, blogs, and other content. A web crawler and data feed 420 can obtain this information by searching pertinent websites and through use of a public API connection to update the metadata database 410. The customer can subscribe to this information about their favorites at the website interface 418, for example. The metadata database watcher 408 monitoring the metadata database 410 can detect when there is a new piece of information about a favorite and transmit the desired notifications using the notification engine 406.

Figure 7:
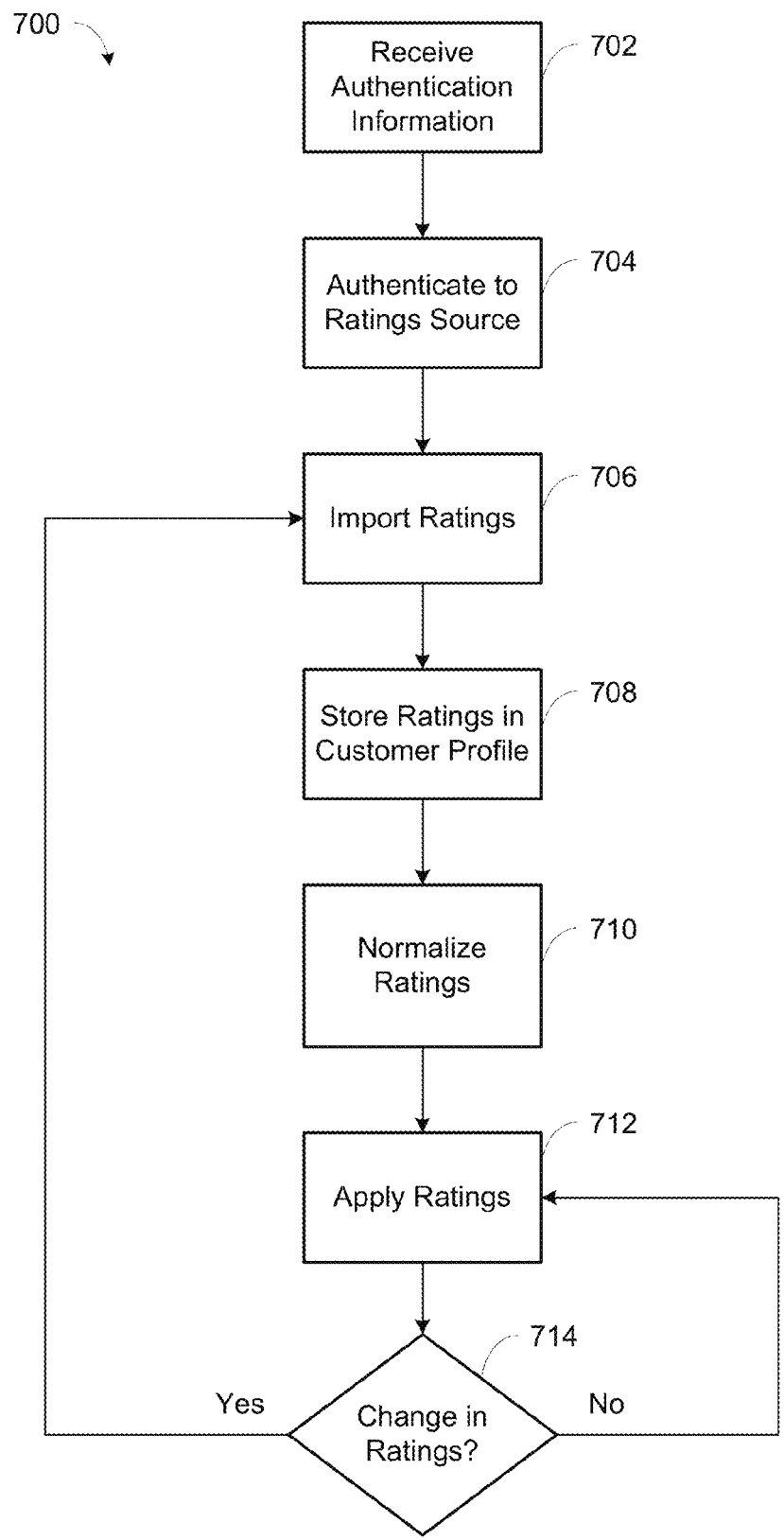
FIG. 7 is a flowchart illustrating operations for importing ratings into a customer profile.

An embodiment of a process 700 for importing ratings of media content is shown in FIG. 7. The process 700 can result in the storage of the ratings of media content in a customer profile. The ratings may also be normalized and applied as a result of the process 700. Media content may include, for example, physical media articles and digital media selections. A user may have generated user-generated ratings at one or more ratings sources, and the user-generated ratings may be imported and aggregated in the customer profile with user-generated ratings that have been set at other ratings sources. The customer profile may be stored in the customer profile database 404.

In some embodiments, professional ratings from established critics, such as from ratings sources like newspapers, magazines, television shows, websites, and the like, may also be imported and aggregated with the user-generated ratings. The professional ratings may utilize the same or similar types of ratings systems as the user-generated ratings described below, e.g., a star rating, a numerical rating, a grade rating, a like/dislike rating, a thumbs up/thumbs down rating, a passive rating, or an age appropriateness rating. The professional ratings and user-generated ratings may be normalized separately or together in any combination, which may then be used to affect recommendations, browsing preferences, and/or sharing and display of the user-generated ratings, as described further below. The user may select which professional ratings, if any, will be imported, normalized, and/or aggregated.

The type of ratings may include, but are not limited to, a star rating, a numerical rating, a grade rating, a like/dislike rating, a thumbs up/thumbs down rating, a passive rating, or an age appropriateness rating. A user-generated rating can be a subjective assessment by a user indicating the user's satisfaction, enjoyment, and/or perception of the quality of a piece of media content. The user-generated rating may also be influenced by whether the user would recommend the piece of media content to others. For example, a user that enjoyed a particular movie because of the actors and the plot may rate that movie more highly than another movie with different actors and plot that the user did not enjoy watching. As another example, a user may give a lower rating to a particular video game that is difficult to play. The user-generated ratings may have been previously created by the user at a ratings source.

In particular, a user may generate a star rating by specifying a particular number of stars on a scale of one to five stars or some other minimum or maximum number of stars. Similarly, a user may generate a numerical rating by specifying a particular number on a scale of 1 to 5, 0 to 10, 0 to 100, or some other minimum or maximum number. A user may generate a grade rating by specifying a particular grade on a scale of A+ to F or some other minimum or maximum grade. The like/dislike rating and thumbs up/thumbs down rating can include ratings that specify a positive or negative assessment. The like/dislike rating and thumbs up/thumbs down rating may include multiple positive and negative levels or degrees to allow a user to more accurately specify the rating. The passive rating may include an action by a user that is implicitly taken as a sign of interest, such as viewing details of a piece of media content; watching, renting, or purchasing a piece of media content; or adding a piece of media content to a viewing or rental queue. The age appropriateness rating may include a binary rating or specification of an age threshold related to whether a piece of media content is appropriate for children of a certain age.

While the ratings are described above as on a linear scale along a single dimension, multi-dimensional ratings are also contemplated. Multi-dimensional ratings may include ratings of different aspects of a piece of media content along different dimensions, which can also be combined into an overall rating. For example, the plot of a piece of media content may be rated along one dimension, the acting of the piece of media content may be rated along a second dimension, and the cinematography of the piece of media content may be rated along a third dimension.

At step 702, authentication information may be received at the central controller 302. The authentication information may allow access to an account at a ratings source that supports the creation of user-generated ratings of media content, and/or access to a ratings source containing professional ratings. The ratings source may include a content provider (e.g., Redbox, Netflix, Hulu, Xbox Live, OnLive, etc.); a website, blog, or mobile application related to a website or blog (Flixster, Rotten Tomatoes, IMDb, Facebook, Metacritic, Amazon, Yahoo! Movies, Fandango, etc.); an A/V display interface 309 (e.g., TiVo digital video recorder (DVR), cable television set-top box, streaming media box, etc.); a content marketplace (e.g., iTunes Store, Android Market, Zune Marketplace, etc.); a trending topics source (e.g., Twitter Trending Topics, etc.); a most popular topics source (e.g., Wall Street Journal Most Popular, Yahoo! Most Popular, etc.); and/or other service, entity, application, or device that allows users to create ratings of media content. The authentication information may include a username and/or a password, for example. The central controller 302 may authenticate to the ratings source at step 704, based on the authentication information received at step 702. Authentication to the ratings source may be through a login to the website of the ratings source, through an application programming interface (API) associated with the ratings source, or through other methods. In the case of professional ratings, authentication to the ratings source may not be necessary using steps 702 and 704, such as when the professional ratings are publically available.

Figure 13:
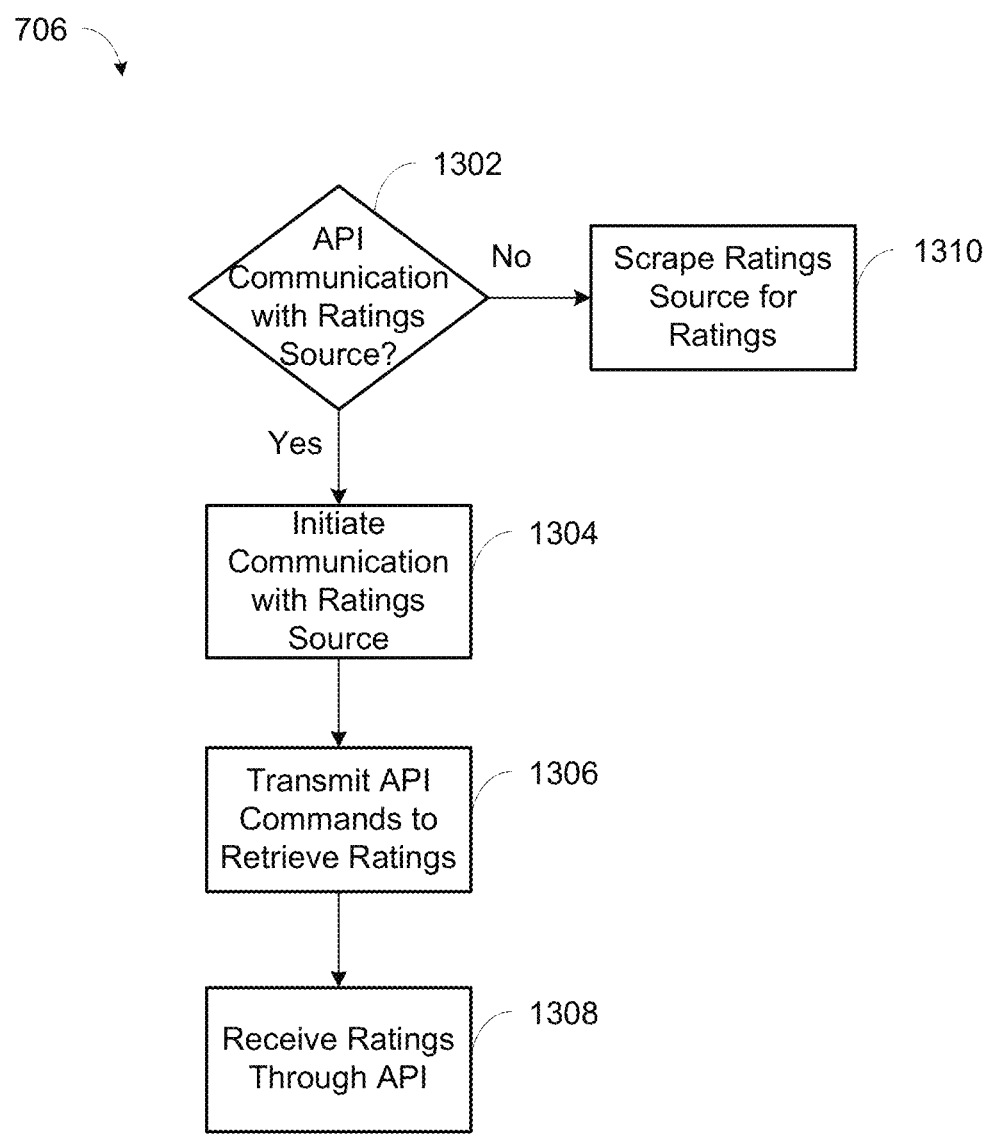
FIG. 13 is a flowchart illustrating operations for importing ratings from a ratings source.

The user-generated ratings that have been created at the ratings source may be imported at step 706. Professional ratings may also be imported at step 706. An embodiment of step 706 in the process 700 is shown in FIG. 13. At step

1302, it is determined whether importation of the user-generated ratings and/or professional ratings is through an API associated with the ratings source or through data scraping techniques. If the communication with the ratings source is through an API, then the process 706 continues to step 1304 to initiate communication with the ratings source through the API. At step 1306, commands conforming to the API of the ratings source are transmitted to the ratings source for retrieval of the ratings. The ratings are received from the ratings source through the API at step 1308.

If the communication with the ratings source is not through an API at step 1302, then data scraping of the ratings source can be performed at step 1310. For example, the central controller 302 may first authenticate to the website of a ratings source at step 704 of the process 700. Once authenticated, the central controller may gather the ratings from the website of the ratings source at step 1310 through one or more data scraping techniques. While there is not explicit permission from the ratings source to obtain these ratings, as opposed to the case of using an API, there is permission from the user to access the user's user-generated ratings from the ratings source. Various known data scraping techniques may be utilized at step 1310 to import the ratings.

Returning to FIG. 7, the imported ratings may be stored at step 708 in the customer profile that is maintained in the customer profile database 404. User-generated or professional ratings that already exist in the customer profile may be aggregated with the imported ratings at step 708. The existing ratings and the imported ratings from step 706 may include the same or different types of ratings. The ratings in the customer profile may differ because the ratings sources from which the ratings came from utilize different types. For example, a TiVo DVR uses a thumbs up/thumbs down rating on a scale from three thumbs up to three thumbs down, the Flixster website utilizes a star rating with a scale from one to five stars, the Metacritic website uses a numerical rating on a scale from 0 to 10, and the IMDb website utilizes a star rating with a scale from one to ten stars.

Figure 8:
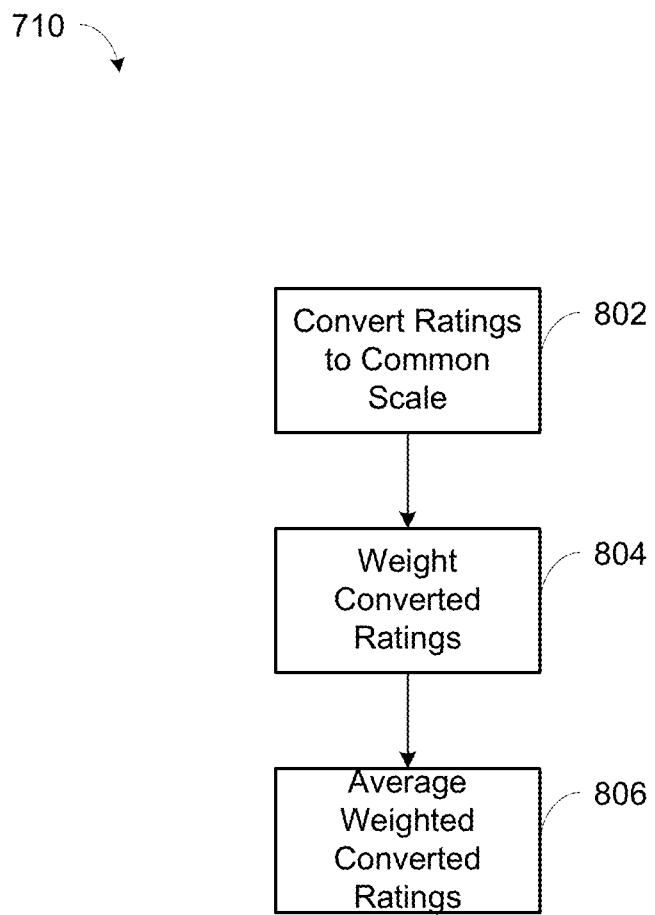
FIG. 8 is a flowchart illustrating operations for normalizing ratings.

At step 710, the ratings may be normalized to produce a normalized rating for a piece of media content. The ratings may be normalized so that differing types of ratings are converted into a single consolidated rating for the piece of media content. An embodiment of step 710 in the process 700 is shown in FIG. 8. At step 802, the different types of ratings may be converted to a common numerical format. Converting the ratings to a common numerical format is useful because of the potential for the stored sets of ratings to be on different scales, e.g., 1 to 10, one to five stars, etc. For example, the common numerical format may be on a scale of 1 to 10. A thumbs up rating may be equal to 8 while a thumbs down rating may be equal to 3. Each star of a five star rating could be equal to 2, e.g., 3 stars=6, 5 stars=10, etc. Other conversions from a particular scale to a common numerical format are possible and contemplated.

The converted ratings may be weighted at step 804 so that a particular set of ratings from one ratings source is emphasized more than another set of ratings from another ratings source. The user may select particular sets of user-generated or professional ratings to weight or the weighting may be automatically selected according to predetermined settings. For example, a user may decide to weight a particular set of user-generated ratings if the user knows that he or she was more thoughtful or spent more time when creating that set of ratings. The ratings may also be weighted equally or not weighted. Finally, at step 806, the converted weighted ratings may be averaged to produce a normalized rating for the piece of media content. The normalized rating may be stored for later use in the process 700.

In some embodiments, ratings by a user for different formats of a particular piece of media content may be imported, stored, and normalized in the customer profile at steps 706, 708, and 710. For example, the DVD version of a piece of media content may have been available prior to the streaming version of the same piece of media content. Accordingly, a user may have rated the DVD version at the ratings source with a first rating at the time of the DVD's availability, and then later rated the streaming version at the same or a different ratings source with a second rating at the time of the streaming version's availability. At steps 706 and 708, the first and second ratings for this piece of media content may be imported and stored into the customer profile. The first and second ratings may be normalized at step 710, such as by averaging the ratings, so that separate ratings for the same piece of media content are not stored.

Figure 9:
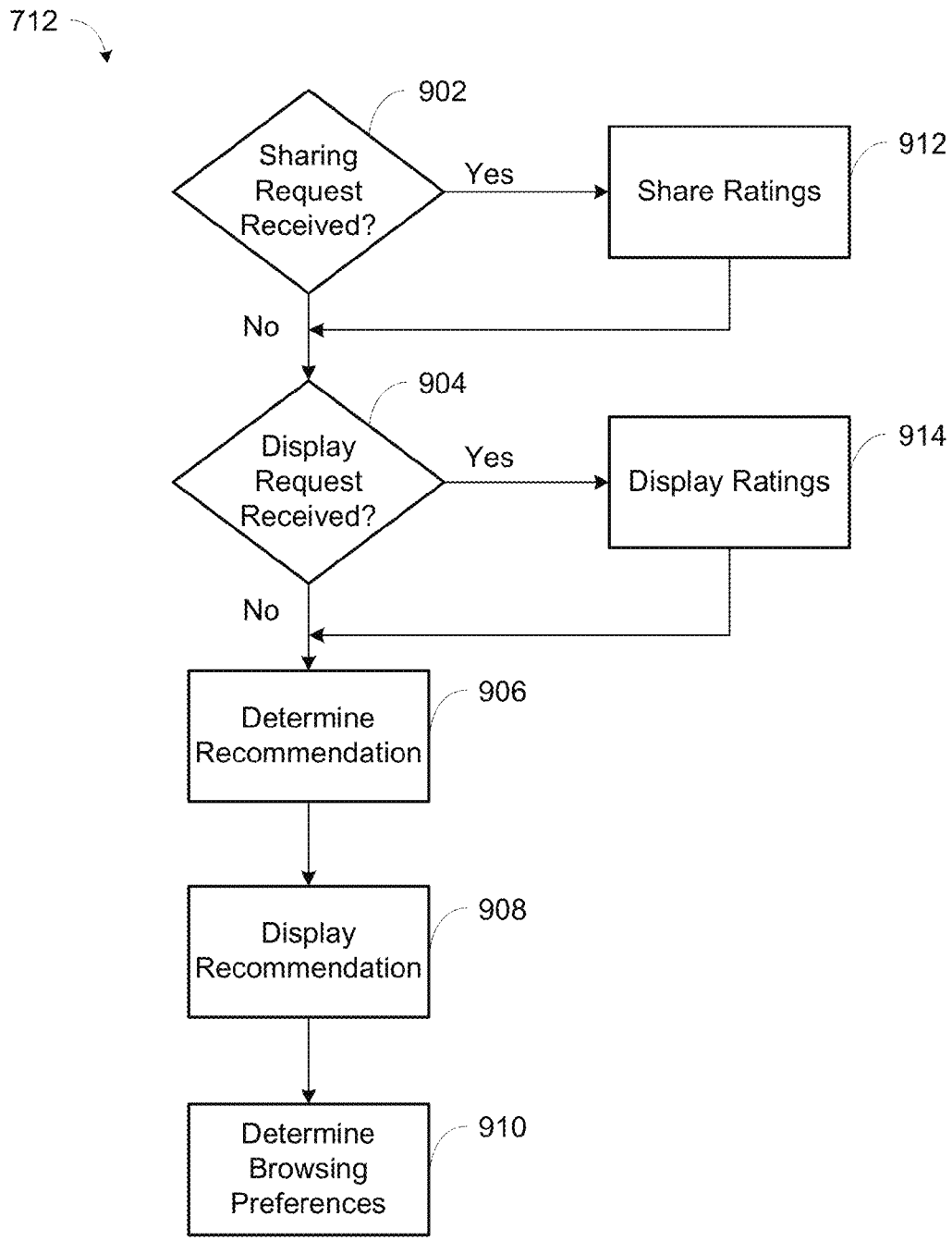
FIG. 9 is a flowchart illustrating operations for applying the ratings in the customer profile.

Returning to FIG. 7, the process 700 continues to step 712 where the user-generated and/or professional ratings may be applied to affect recommendations, browsing preferences, and/or sharing and display of the ratings. The ratings that are applied at step 712 may include the individually stored ratings from the ratings sources and/or the normalized rating produced at step 806. An embodiment of step 712 in the process 700 is shown in FIG. 9. At step 902, it is determined whether a sharing request has been received from one or more users. A sharing request may be received from a user to request sharing of their user-generated ratings that are stored in their customer profile with other users. For example, a user may wish to share their individually stored user-generated ratings or their normalized rating with users that are friends. If a sharing request has been received at step 902, then the ratings may be shared at step 912. If a sharing request was not received at step 902, or following step 912, it is determined whether a display request has been received at step 904. A display request may be received from a user to request the display of their ratings that are stored in their customer profile. The ratings may be displayed publically, to the user, or to other users, for example.

If a display request has been received at step 904, then the ratings may be displayed at step 914. The ratings can be displayed, for example, on an article dispensing machine 230, a website interface 418, an electronic device 306, or an A/V display interface 309. When ratings are displayed at step 914, the ratings may be converted to an appropriate format for the display and system on which the ratings are being viewed on. For example, if the article dispensing machine 230 displays a five star rating and the normalized rating is on a scale of 1 to 10, then a rating between 5.0 and 6.9 may be displayed as three stars, a rating between 6.0 and 8.8 may be displayed as 4 stars, a rating of 8.9 and above may be displayed as 5 stars, etc. As another example, if the website interface 418 displays a like/dislike rating and the normalized rating is on a scale of 1 to 10, then a rating of 5.0 and above may be displayed as a like rating and a rating of 4.9 and below may be displayed as a dislike rating. Other conversions to an appropriate display format from the normalized rating are possible and contemplated. Following step 914, or if a display request was not received at step 904, the process 712 continues to step 906.

One or more recommendations related to media content may be determined at step 906, based on the user-generated and/or professional ratings. The recommendations may be based on the individually stored ratings and/or the normalized rating. In some embodiments, a user can subscribe or follow the user-generated ratings of other users and/or the professional ratings from critics. The subscribed or followed ratings may be viewed by the user, or may be used as the basis for the recommendations.

One or more specific pieces of media content, including physical media articles and digital media selections, may be recommended based on the ratings. Recommendations may be determined using a k-nearest neighbor approach, collaborative filtering, a genome approach, or other methodologies, such as with systems including Jinni, Gravity R&D, IntroAnalytics, Adobe Recommendations (powered by Omniture), The Filter, and other systems. A genome approach, such as the approach used by Pandora Radio and the Music Genome Project, includes analyzing an entire library of content based on one or more objective measures, creating archetypes of users based on the analyzed content, assuming that a user is a particular archetype, and making recommendations that match that particular archetype. A transaction history of the user may also be utilized to determine recommendations of media content at step 906. The transaction history may include, for example, the metadata related to media content that the user has rented, purchased, downloaded, or streamed. The transaction history may be retrieved from the customer profile in the customer profile database 404, for example.

The determined recommendations may be displayed to the user at step 908. The recommendations may be displayed on an article dispensing machine 230, a website interface 418, an electronic device 306, or an A/V display interface 309, for example. The recommendations may be additionally filtered so that only available media articles and available media selections are displayed. Determining a list of available media articles that are distributable from an article dispensing machine 230 is discussed in more detail below with reference to FIG. 11. Determining a list of available media selections is discussed in more detail below with reference to FIG. 12.

Following step 908, browsing preferences may be determined at step 910, based on the user-generated and/or professional ratings. The browsing preferences may be based on the individually stored ratings and/or the normalized rating. The determined browsing preferences may be stored in the customer profile, and can affect how a user browses through listings of media content. For example, if the user-generated ratings indicate that a user prefers a certain genre, then the user's browsing preferences may be set so that genre is only shown or is shown first. The browsing preferences may applied to listings of media content on article dispensing machine 230, a website interface 418, an electronic device 306, or an A/V display interface 309, for example.

Returning to FIG. 7, the process 700 continues to step 714 where it is detected whether there has been a change in the ratings at a ratings source. The change in the ratings may include the addition, deletion, or modification of the ratings. If a change in the ratings is detected at step 714, then the process 700 may return to step 706 to import the changed ratings, store the changed ratings in the customer profile at step 708, normalize the ratings at step 710, and apply the ratings at step 712. If no change in the ratings is detected at step 714, then the process 700 may return to step 712 to apply the existing ratings, as described above. In one embodiment, to detect a change in the ratings, the central controller 302 can periodically access the ratings source using the authentication information to retrieve the ratings and compare them to the existing ratings in the customer profile. In another embodiment, the central controller 302 can utilize the API associated with the ratings source to retrieve the ratings and compare them to the existing ratings in the customer profile to detect a change in the ratings. In a further embodiment, to detect a change in the ratings, the ratings source can transmit a signal to the central controller 302 signifying that a change in the ratings has occurred. The central controller 302 may then retrieve or receive the change(s) in the ratings.

In the case where the central controller 302 compares ratings to existing ratings to determine a change in the ratings at step 714, the entire set or a subset of ratings may be compared. In one embodiment, a last modified timestamp may be associated with each of the ratings at the ratings sources such that it could be determined which of the ratings have changed rather than examining all of the ratings. In another embodiment, the central controller 302 could also create and store a hash table of the existing ratings and compare the hash table with a newly created ratings hash table upon accessing a ratings source to determine if there are any changes. If the hash tables match, then there is no change in the ratings, but if the hash tables differ, then there is a change in the ratings that can be subsequently retrieved.

Figure 10:
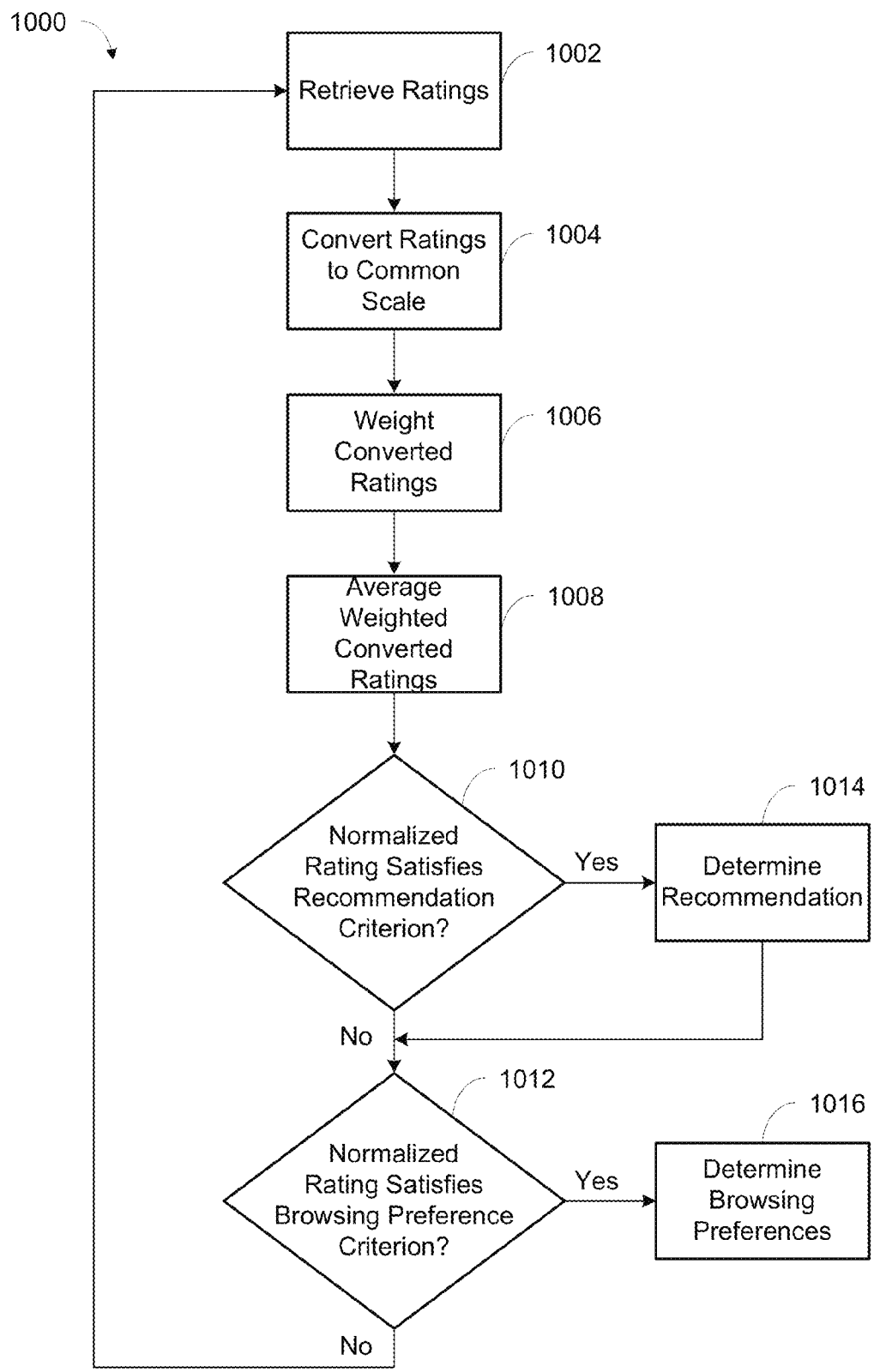
FIG. 10 is a flowchart illustrating operations for normalizing ratings in a customer profile and applying the ratings.

An embodiment of a process 1000 for normalizing ratings of media content is shown in FIG. 10. The process 1000 can result in the normalization of multiple user-generated and/or professional ratings of a piece of media content from multiple ratings sources. Media content may include, for example, physical media articles and digital media selections. The ratings may have been previously generated at one or more ratings sources, and the ratings may have been previously imported and stored in the customer profile. The customer profile may be stored in the customer profile database 404. As described above, the type of ratings may include a star rating, a numerical rating, a grade rating, a like/dislike rating, a thumbs up/thumbs down rating, a passive rating, or an age appropriateness rating.

At step 1002, the ratings can be retrieved from the customer profile. The ratings may have been previously imported and stored in the customer profile, such as through steps of the process 700 described above. The retrieved ratings may be converted to a common numerical format at step 1004. At step 1006, the converted ratings may be weighted so that a particular subset of ratings from one ratings source is emphasized more than another subset of ratings from another ratings source. The weighting may be automatically selected according to predetermined settings or the user may select particular sets of ratings to weight. Ratings may also be weighted equally or not weighted. Then, the converted weighted ratings can be averaged at step 1008 to produce a normalized rating for the piece of media content.

At step 1010, it may be determined whether the normalized rating satisfies a predetermined criterion related to recommendations of media content. Normalized ratings for one or more pieces of media content may be utilized at step 1010. The predetermined criterion may include a numerical threshold that the normalized rating must meet or exceed to result determining recommendations related to media content. If the normalized rating satisfies the predetermined criterion at step 1010, then the recommendations of media content may be determined at step 1014. Recommendations may be determined using a k-nearest neighbor approach, collaborative filtering, a genome approach, or other methodologies. For example, if the normalized rating for the movie Raiders of the Lost Ark meets or exceeds the predetermined criterion at step 1010, then recommendations of media content based on that movie may be determined at step 1014, such as the movies Romancing the Stone and Indiana Jones and the Last Crusade, or the video game Lego Indiana Jones: The Original Adventures.

The determined recommendations may also be displayed at step 1014, such as on an article dispensing machine 230, a website interface 418, an electronic device 306, or an A/V display interface 309. The recommendations may be additionally filtered so that only available media articles and available media selections are displayed. Determining a list of available media articles that are distributable from an article dispensing machine 230 is discussed in more detail below with reference to FIG. 11. Determining a list of available media selections is discussed in more detail below with reference to FIG. 12.

If the normalized rating does not satisfy the predetermined criterion at step 1010, or following step 1014, the process 1000 continues to step 1012. At step 1012, it may be determined whether the normalized rating satisfies a predetermined criterion related to browsing preferences. Normalized ratings for one or more pieces of media content may be utilized at step 1012. The predetermined criterion may include a numerical threshold that the normalized rating must meet or exceed to result in a change to the browsing preferences of a user. The browsing preferences may be stored in the customer profile, and can affect how a user browses through listings of media content. If the normalized rating satisfies the predetermined criterion at step 1012, then the browsing preferences may be determined at step 1016. The browsing preferences may applied to listings of media content on article dispensing machine 230, a website interface 418, an electronic device 306, or an A/V display interface 309. For example, if the normalized ratings for the television show The A-Team and the movie Rocky III meet or exceed the predetermined criterion at step 1012, then browsing preferences for the action genre and/or the actor Mr. T may be determined at step 1014.

Figure 11:
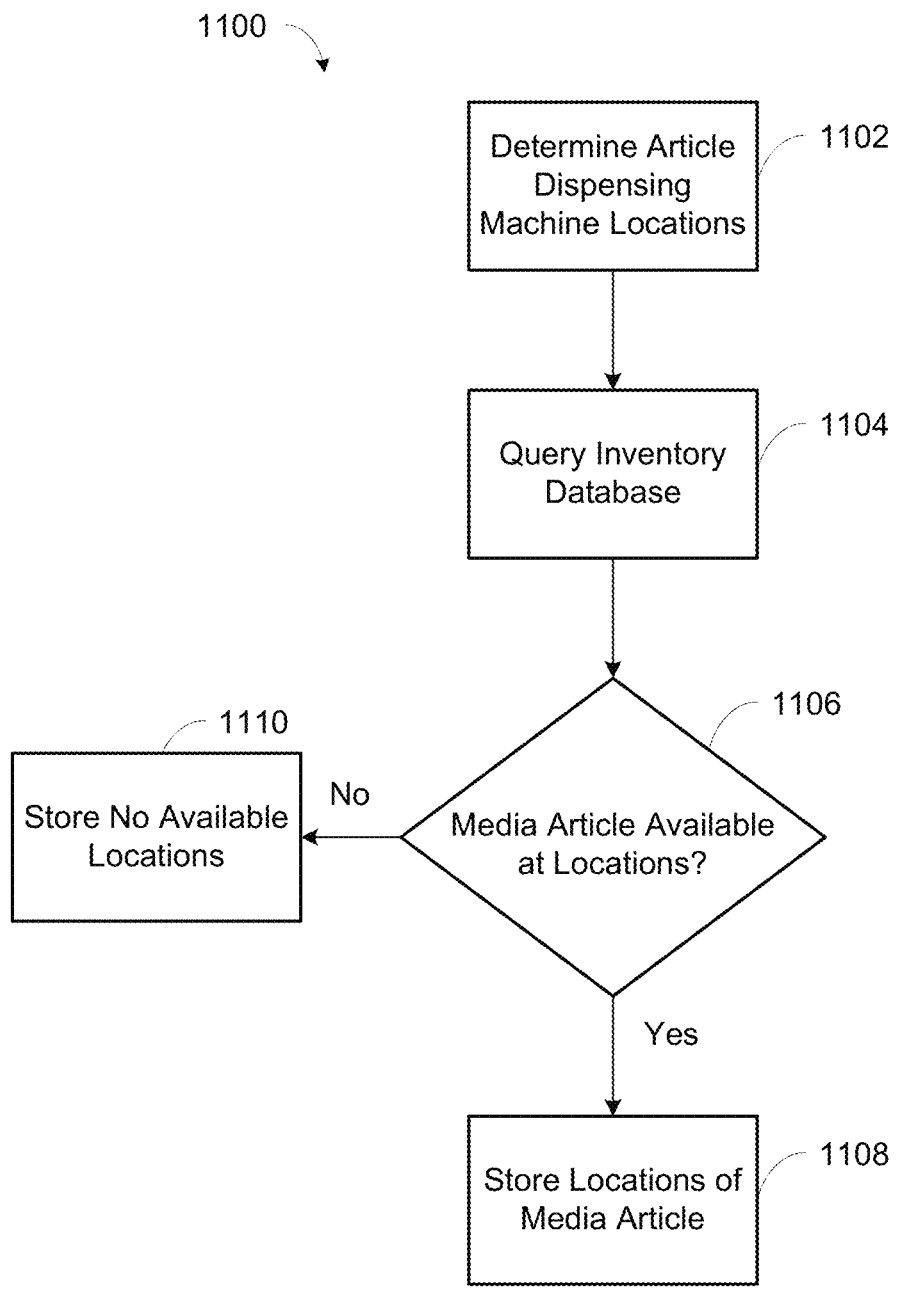
FIG. 11 is a flowchart illustrating operations for determining availability of a media article.

An embodiment of determining availability of physical media articles is shown in the process 1100 of FIG. 11. The process 1100 may be implemented as part of step 906 of FIG. 9 or step 1014 of FIG. 10 if the recommended media content is a physical media article that may be available at an article dispensing machine 230. The process 1100 may be performed alone or in addition to the process 1200 described below. At step 1102, the location of one or more article dispensing machines 230 can be determined. The location(s) of the article dispensing machines 230 can be determined based on geographic proximity to the location where the customer or user is located, such as based on the address of the customer in the customer profile database 404. The article dispensing machine 230 locations could also be determined based on a location that is manually entered by a user. The locations of the article dispensing machines 230 that are closest to the originating location may then be determined. The locations may be limited by a radius, city, town, zip code, or other limitation. The location of one or more specific article dispensing machines 230 may also be input by a user at step 1102.

At step 1104, the inventory database 412 can be queried to determine whether the media article is available at the locations of the article dispensing machines 230 determined at step 1102. If the media article is available at one or more article dispensing machines 230 at step 1106, then at step 1108, the locations of those article dispensing machines 230 can be stored for use in determining the recommendations at step 906 in the process 712 or at step 1014 in the process 1000. However, if the media articles are not available at any article dispensing machine 230 at step 1106, then no available locations can be stored at step 1110.

Figure 12:
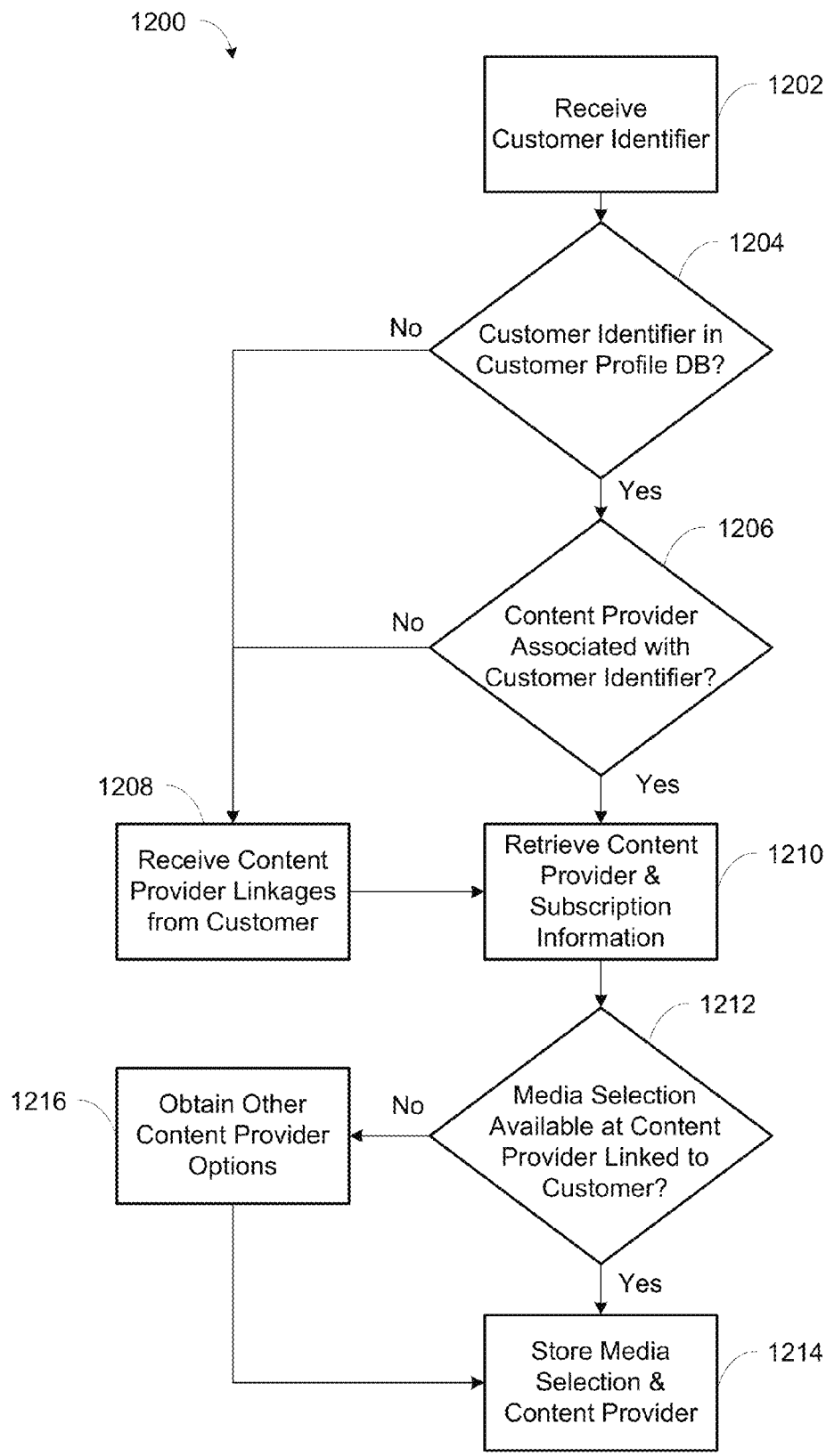
FIG. 12 is a flowchart illustrating operations for determining availability of a media selection.

An embodiment of determining availability of digital media selections is shown in the process 1200 of FIG. 12, including determination of an associated content provider and the availability of the media selections at the associated content provider. The process 1200 may be implemented as part of step 906 of FIG. 9 or step 1014 of FIG. 10 if the recommended media content is a digital media selection that may be available at a content provider. The process 1200 may be performed alone or in addition to the process 1100 described above. At step 1202, a unique customer identifier may be received by the central controller 302. The central controller 302 can match the unique customer identifier to a particular customer profile in the customer profile database 404. The unique customer identifier could be a credit or debit card number processed through a hash function. The hashed credit or debit card number can be used to look up a customer profile in the customer profile database 404. The unique customer identifier may also include a customer-provided identification of the associated content provider. The customer could also provide what content providers they are associated with, and optionally provide the specific subscription package they subscribe to, instead of providing a credit card number or account number. The unique customer identifier could also be a username and/or password to access the customer profile in the customer profile database 404. The unique customer identifier may be received from an article dispensing machine 230 or an application running on an electronic device 306 or A/V display interface 309.

At step 1206, the central controller 302 can determine whether there is an associated content provider linked to the customer profile found at step 1204. The customer profile in the customer profile database 404 may contain a linkage to an associated content provider. If there is not a content provider associated with the customer profile at step 1206 or if no unique customer identifier is found in the customer profile database 404 at step 1204, the customer may provide the linkages of content providers at step 1208. The customer profile in the customer profile database 404 can include information obtained from the content provider customer profile database 502 in the content provider backend 308, such as an account number, email address, subscription information, and other information related to the customer's content provider customer profile.

If there is a content provider associated with the customer identifier at step 1206, the process continues to step 1210 where subscription information at the content provider for the customer is retrieved from the customer profile database 404. The customer profile database 404 may contain subscription and entitlement information that was previously received from the content provider customer profile database 502 in the content provider backend 308. Subscription information at the content provider can include the customer's subscribed service package, premium channel content the customer entitled to access, zip code and address for possible geographical content restrictions, parental authorization and controls for age authentication, and other subscriber information. The subscription information may be used by the central controller 302 at step 1212 when determining the availability of media selections for the customer at particular content providers. Step 1210 is also performed following step 1208 when a customer has entered a linkage to a content provider.

At step 1212, the central controller 302 determines whether the media selections are available at a content provider that is linked to the customer. In addition to determining whether the media selections are available at a linked content provider, the central controller 302 can determine at step 1212 whether the customer has permission to access the media selection based on the subscription information in the customer profile database 404 that was previously obtained at step 1210.

A customer may be entitled to access a digital media selection for free, such as when the media selection is already available within the customer's subscription package, or when the media selection is publicly available. In other cases, a customer may only have access to a media selection by providing additional payment, such as when the customer's subscription package does not allow access to the media selection or when the media selection is only available at an a la carte content provider. For example, if the customer's subscription package allows access to Home Box Office (HBO) content and the media selection is available through HBO, then the customer will have access to the media selection without additional payment. As another example, if the customer's subscription package only allows access to Showtime content and the media selection is only available through HBO, then the customer will not have access to the media selection. In this case, the customer may have the option to upgrade their subscription package to include HBO or utilize an a la carte content provider for an additional payment. As a further example, if the customer is a Comcast subscriber and the media selection is available as a free video-on-demand selection on Comcast, then the customer will have access to the media selection without additional payment. However, if the media selection is only available through Hulu Plus, then the customer will not have access to the media selection unless the customer provides additional payment.

Therefore, if the media selection is available at a linked content provider at step 1212, then at step 1214, the media selections and associated content providers can be stored for use in determining recommendations at step 906 in the process 712 or at step 1014 in the process 1000. If the media selection is not available at a linked content provider at step 1212, then the central controller 302 can obtain other content provider options, if any, at step 1216. Other content provider options may include a la carte content providers such as Amazon Instant Video, iTunes Store, YouTube, VUDU, and other services that allow a user to individually purchase media without requiring a subscription. Further content provider options that may be obtained at step 1216 include retailers that grant rights to a digital media selection in conjunction with the purchase of a physical item (e.g., Best Buy, Walmart, etc.), movie studios, television networks, video game developers, and online gaming delivery services (Xbox Live, PlayStation Network, OnLive, etc.). For example, a video game may be available from an online gaming delivery service for download, such as from Xbox Live or the PlayStation Network, or for streaming, such as from OnLive. If other content providers are available for the media selection, the media selection and the associated a la carte content provider(s) may be stored at step 1214.

Any process descriptions or blocks in figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The invention claimed is:

1. A method of aggregating ratings with computer(s) having processor(s) and memory, the method comprising, with the processor(s):
   accessing a source of ratings;
   determining whether the accessed source of ratings has authorized importation of the ratings by the processor(s) via an API;
   (1) when the source of ratings has authorized importation of the ratings by the processor(s) via the API: importing the ratings from the source of ratings via the API,
   (2) when the source of ratings has not authorized importation of the ratings by the processor(s) via the API: importing the ratings from the source of ratings via one or more data scraping techniques;
   saving the imported ratings in a database;
   hashing the imported ratings to generate one or more first hashes;
   re-accessing the source of ratings;
   hashing the re-accessed ratings to generate one or more second hashes;
   comparing the first hashes to the second hashes, and when the first hashes differ from the second hashes: updating the saved imported ratings in the database with the re-accessed ratings.

2. The method of claim 1, wherein the source of ratings includes multi-dimensional ratings for a single title.

3. The method of claim 1, including, with the processor(s):
   accessing multiple sources of ratings;
   importing ratings from multiple sources of ratings;
   saving the ratings from the multiple sources of ratings in the database;
   normalizing the saved ratings to a common scale.

4. The method of claim 3, including, with the processor(s):
   associating each of the normalized ratings with a particular title;
   for each particular title: averaging the associated normalized ratings to generate a single normalized rating.

5. The method of claim 4, wherein the averaging is performed according to a formula that gives more weight to normalized ratings from a first source of ratings and less weight to normalized ratings from a second source of ratings.

6. The method of claim 4, including, with the processor(s):
   receiving a ratings display request;
   accessing one or more normalized ratings;
   formatting the one or more normalized ratings based on the ratings display request.

7. The method of claim 1, including, with the processor(s):
   retrieving credentials from a database;
   accessing a content source with the retrieved credentials;
   determining titles available on the content source;
   storing a list of the available titles on the database.

8. The method of claim 7, including, with the processor(s):
generating a list of recommended titles based on: (a) the updated saved imported ratings and (b) the list of the available titles stored in the database.

9. The method of claim 1, including, with the processor(s):
comparing the first hashes to the second hashes, and when the first hashes match the second hashes: discarding and deleting the re-accessed ratings.

10. The method of claim 1, including, with the processor(s):
prior to saving the imported ratings in the database, determining whether the ratings from the source of ratings include a plurality of ratings for a single title, and if the determination is positive, combining the plurality of ratings for the single title into a combined rating; and
wherein the step of saving the imported ratings in the database includes, for each title with a plurality of ratings from the source of ratings, saving the combined rating in the database and discarding the plurality of ratings.

11. The method of claim 1, wherein at least one of the imported ratings includes a user transaction history.

12. A system comprising:
a central server with a first processor and a first memory, the first processor to cause the central server to:
access a plurality of sources of ratings of media content;
for each one of the plurality of sources of ratings, determine whether the central server is authorized to import the ratings via an API;
when the central server is authorized to import the ratings via an API, import the ratings from the source of ratings via the API, and when the central server is not authorized to import the ratings via the API, import the ratings from the source of ratings via one or more data scraping techniques;
save the imported ratings in a database;
hash the imported ratings to generate a first hash;
calculate combined ratings for the media content based on the imported ratings in the database;
re-access the source of ratings;
hash the re-accessed ratings to generate a second hash;
compare the first hashes to the second hash;
in response to the first hash differing from the second hash: updating the saved imported ratings in the database with the re-accessed ratings and recalculating the combined ratings; and
an article dispensing machine with a second processor and second memory, the second processor to cause the article dispensing machine to:
receiving the combined ratings for the media content from the central server;
display a selection of the media content based on the combined ratings and which media articles corresponding to the media content are located within the article dispensing machine; and
in response to receiving a selection of one of the displayed media content, dispense the corresponding media article.

* * * * *